United States Patent [19]

Masuda et al.

[11] Patent Number: 5,548,513

[45] Date of Patent: Aug. 20, 1996

[54] DRIVING-WHEEL TORQUE CONTROL SYSTEM FOR AUTOMOTIVE VEHICLES

[75] Inventors: Katsuhiko Masuda; Jun Aoki; Isamu Hashizume, all of Wako, Japan

[73] Assignee: Honda Giken Kogyo Kabushiki Kaisha, Tokyo, Japan

[21] Appl. No.: 131,944

[22] Filed: Oct. 8, 1993

[30] Foreign Application Priority Data

Oct. 12, 1992 [JP] Japan .................................. 4-299251
Oct. 14, 1992 [JP] Japan .................................. 4-301870

[51] Int. Cl.$^6$ ............................................. B60K 23/04
[52] U.S. Cl. .............................. 364/426.03; 364/426.01; 180/197
[58] Field of Search ........................ 364/426.01, 426.02, 364/426.03; 180/197, 248

[56] References Cited

U.S. PATENT DOCUMENTS

| | | | |
|---|---|---|---|
| 4,941,095 | 7/1990 | Imaseki et al. | 364/424.05 |
| 4,973,294 | 11/1990 | Kobari et al. | 475/150 |
| 5,005,131 | 4/1991 | Imaseki et al. | 364/426.02 |
| 5,075,854 | 12/1991 | Imaseki et al. | 364/424.05 |
| 5,287,941 | 2/1994 | Masuda et al. | 180/197 |
| 5,366,041 | 11/1994 | Shiraishi et al. | 180/248 |

OTHER PUBLICATIONS

Patent Abstracts of Japan, vol. 13, No. 257 (M–837)(3605) Jun. 14, 1989 & JP–A–01 060 433 (Nissan Motor Co Ltd) 7 Mar. 1989, abstract.

Patent Abstracts of Japan, vol. 15, No. 509 (M–1195)(5037) Dec. 24, 1991 & JP–A–03 224 827 (Hino Motors Ltd) 3 Oct. 1991, abstract.

*Primary Examiner*—Michael Zanelli
*Attorney, Agent, or Firm*—Armstrong, Westerman, Hattori, McLeland & Naughton

[57] ABSTRACT

A driving-wheel torque control system for an automotive vehicle determines whether or not the driving wheels of the vehicle are in a predetermined racing state. If it is determined that the driving wheels are in the predetermined racing state, the limited slip differential torque is held at a first value substantially equal to or close to a second value thereof assumed when it is determined that the driving wheels are in the predetermined racing state.

26 Claims, 12 Drawing Sheets

DRIVING-WHEEL TORQUE CONTROL SYSTEM FOR AUTOMOTIVE VEHICLES

BACKGROUND OF THE INVENTION

1. Field of the Invention

This invention relates to a driving-wheel torque control system for automotive vehicles, and more particularly to a driving-wheel torque control system of this kind which has a variable-torque limited slip differential arranged between left and right driving wheels for properly distributing a limited slip differential torque (hereinafter referred to as "LSD torque") to a racing driving wheel and a non-racing driving wheel to thereby control the torque of the driving wheels.

2. Description of the Related Art

Conventionally, a torque distribution control system has been proposed, e.g., by Japanese Provisional Patent Publication (Kokai) No. 64-60433 (hereinafter referred to as "the first prior art system"), which comprises a variable-torque limited slip differential having a multiple disc friction clutch, which is arranged between a pair of left and right driving wheels for generating a limited slip differential torque created by hydraulic pressure externally applied thereto. According to this system, LSD torque is distributed between the left and right driving wheels according to a difference in the rotational speed between the left and right driving wheels so as to properly control relative driving forces of the left and right driving wheels.

If LSD torque is applied upon slippage of one of the left and right driving wheels during cornering of the automotive vehicle, the so-called steering characteristic deviates either in an understeering direction or in an oversteering direction, making it difficult for the vehicle to turn around. To overcome this inconvenience, another limited slip differential torque control system has also been proposed, e.g., by Japanese Provisional Patent Publication (Kokai) No. 3-224827 (hereinafter referred to as "the second prior art system") in which the LSD torque is reduced or cancelled when the two driving wheels are both determined to be in slippage.

In the first and second prior art systems described above, when the vehicle is traveling at a low speed on a so-called split μ road having a road surface which has unevenness in friction coefficient from portion to portion, such as a snow-covered road and a bad road, if one of the left and right driving wheels, which is on a low μ road portion side, slips, the difference in the rotational speed between the driving wheels is detected, and LSD torque is transmitted to the racing driving wheel on the low μ road portion side, and the other or non-racing driving wheel, such that reduced torque is transmitted to the racing driving wheel, and increased torque to the non-racing driving wheel, to limit the difference in the rotational speed between the driving wheels, thereby allowing a proper amount of the driving force of the non-racing driving wheel to be transmitted to the road surface. In this manner, the prior art systems attempt to improve the traveling ability, i.e., the drivability and stability of behavior of the automotive vehicle during running on a split μ road.

Further, in the second prior art system, the LSD torque is reduced or canceled upon determining that both the left and right driving wheels are in slippage, based on the difference in the rotational speed between the driving wheels and the difference in the rotational speed between the front and rear wheels, to thereby prevent a so-called sideslip or skid and enhance the traveling stability when the vehicle is running straight.

However, although the traveling ability of the automotive vehicle during traveling on a snow-covered road or a bad road is improved as described above, the first and second prior art systems still have a disadvantage encountered when the vehicle is traveling at a high speed on a pool of liquid on the road. That is, on such an occasion, there occurs a hydroplaning phenomenon such that both the driving wheels race so that the balance in driving force between the two driving wheels is lost to make it impossible to control the vehicle by its steering wheel, resulting in a sideslip or skid of the vehicle. Therefore, the first and second prior art systems cannot prevent degradation in the drivability and traveling behavior of the automotive vehicle in such events.

Further, the second prior art system, which reduces or cancels the LSD torque when it is determined that both the driving wheels are in slippage, has the disadvantage that when the vehicle is traveling on a road having a slippery surface, such as a snow-covered road and an icy road, both the driving wheels are liable to slip, and hence the LSD torque is frequently reduced or canceled, thereby making it impossible to effectively apply the LSD torque, which results in degraded drivability of the vehicle.

Further, when the vehicle is traveling on a so-called split μ road having a surface which has unevenness in friction coefficient from portion to portion, a driving wheel on a low μ road portion side largely slips, and hence a large LSD torque acts on the driving wheels. Therefore, both the driving wheels suddenly slip, whereupon the LSD torque is suddenly reduced or canceled. As a result, the driving wheel on the low μ road portion side slips again, and hence a large LSD torque is generated again, which results in a frequent change in the driving forces of the driving wheels, causing offensive vibrations.

Further, when the vehicle uses studless tires, the vehicle traveling on a snow-covered road exhibits better derivability when the degree of slippage is large provided that the studless tires are new. Therefore, in such cases, the driver of the vehicle may wish to intentionally cause the driving wheels to slip. However, according to the above second prior art system, the LSD torque is reduced or canceled immediately upon detection of slippage of the driving wheels, and hence it is impossible for the driver to obtain drivability of the vehicle as intended.

Further, when the driver intentionally causes the driving wheels to slip during cornering of the vehicle, the LSD torque is also reduced or canceled as described above, and hence the driver cannot expect a behavior of the vehicle as desired.

SUMMARY OF THE INVENTION

It is the object of the invention to provide a driving-wheel torque control system for an automotive vehicle, which is capable of avoiding degradation in the drivability of the vehicle even when both the driving wheels of the vehicle are in slippage to thereby cause the vehicle to exhibit a behavior fully reflecting the driver's intention.

To attain the above object, according to the present invention, there is provided a driving-wheel torque control system for an automotive vehicle having left and right driving wheels, including a variable limited slip differential torque-creating device arranged between the left and right driving wheels for generating a predetermined limited slip differential torque such that reduced torque is transmitted to a racing one of the left and right driving wheels and increased torque is transmitted to a non-racing one of the left and right driving wheels.

The driving-wheel torque control system according to the present invention comprises:

racing state-determining means for determining whether or not the driving wheels are in a predetermined racing state; and torque-holding means for holding the limited slip differential torque at a first value substantially equal to or close to a second value thereof assumed when it is determined that the driving wheels are in the predetermined racing state, if it is determined by the racing state-determining means that the driving wheels are in the predetermined racing state.

Preferably, the first value at which the limited slip differential torque is held is larger than the second value assumed when the driving wheels are in the predetermined racing state.

More preferably, the torque-holding means includes torque-reducing/canceling means for reducing or canceling the limited slip differential torque, after the limited slip differential torque is held at the first value over a predetermined time period.

Further preferably, the predetermined time period is set to a longer time period when the rotational speed of one of the driving wheels positioned on an inner side relative to the center of cornering of the vehicle has drastically dropped.

Alternatively, the limited slip differential torque is decreased at a lower rate after the predetermined time period has elapsed, when the rotational speed of one of the driving wheels positioned on an inner side relative to the center of cornering of the vehicle has drastically dropped.

Preferably, the vehicle includes left and right trailing wheels, and the racing state-determining means determines that the driving wheels are in the predetermined racing state, when a ratio of a rotational speed of one of the driving wheels positioned on an outer side relative to a center of cornering of the vehicle to a rotational speed of the trailing wheel positioned on the outer side is larger than a predetermined value.

More preferably, the driving-wheel torque control system includes vehicle speed-detecting means for detecting a travelling speed of the vehicle, and the predetermined value is set depending on the travelling speed detected by the vehicle speed-detecting means increases.

Further preferably, the predetermined value is set to a smaller value as the traveling speed detected by the vehicle speed-detecting means increases.

Still more preferably, the driving-wheel torque control system includes vehicle acceleration-detecting means for detecting an acceleration including deceleration of the vehicle, and the predetermined value is set depending on the acceleration including deceleration detected by the vehicle acceleration-detecting means.

Even more preferably, the predetermined value is set to a lower value as the acceleration of the vehicle assumes a lower value.

Preferably, the driving-wheel torque control system includes vehicle speed-detecting means for detecting a travelling speed of the vehicle, and the first value at which the limited slip differential torque is held by the torque-holding means is set to a value dependent on the travelling speed detected by the vehicle speed-detecting means.

More preferably, the vehicle includes left and right trailing wheels, and the vehicle speed-detecting means detects the traveling speed of the vehicle based on the larger one of rotational speeds of the trailing wheels.

Preferably, the driving-wheel torque control system includes vehicle acceleration-detecting means for detecting an acceleration including deceleration of the vehicle, and the first value at which the limited slip differential torque is held by the torque-holding means is set to a value dependent on the acceleration including deceleration detected by the vehicle acceleration-detecting means.

Preferably, the first value at which the limited slip differential torque is held is equal to the second value assumed when the driving wheels are in the predetermined racing state.

Preferably, the vehicle includes left and right trailing wheels, and the limited slip differential torque is reduced when acceleration of a racing one of the left and right driving wheels or deceleration of a racing one of the left and right trailing wheels exceeds a predetermined value thereof.

More preferably the limited slip differential torque is decreased as the acceleration or deceleration is larger beyond a predetermined value.

Further preferably, the driving-wheel torque control system includes vehicle speed-detecting means for detecting a traveling speed of the vehicle, driving wheel rotational speed difference-detecting means for detecting a difference between rotational speed of the driving wheels, acceleration-calculating means for calculating acceleration of one of the driving wheels having a higher rotational speed, and torque-reducing means for reducing the limited slip differential torque according to the acceleration calculated by the acceleration-calculating means, when the traveling speed of the vehicle detected by the vehicle speed-detecting means is higher than a first predetermined value, the difference between the rotational speeds of the driving wheels detected by the rotational speed difference-detecting means is higher than a second predetermined value, and at the same time the acceleration calculated by the acceleration-calculating means is higher than a third predetermined value.

Also preferably, the driving-wheel torque control system includes vehicle speed-detecting means for detecting a traveling speed of the vehicle, trailing wheel rotational speed difference-detecting means for detecting a difference between rotational speeds of the trailing wheels, deceleration-calculating means for calculating deceleration of one of the trailing wheels having a lower rotational speed, and torque-reducing means for reducing the limited slip differential torque according to the deceleration calculated by the deceleration-calculating means, when the traveling speed of the vehicle detected by the vehicle speed-detecting means is higher than a first predetermined value, the trailing wheel rotational speed difference detected by the trailing wheel rotational speed difference-detecting means is higher than a second predetermined value, and at the same time the deceleration calculated by the deceleration-calculating means is higher than a third predetermined value.

Preferably, the vehicle includes an anti-lock brake system, and the driving-wheel torque control system includes torque-canceling means for canceling the limited slip differential torque immediately before or immediately after the anti-lock brake system starts to operate.

Preferably, the vehicle includes an engine having an intake passage, the driving-wheel torque control system including pressure-detecting means for detecting pressure within the intake passage, change rate-calculating means for calculating a rate of change in the pressure within the intake passage, and engine rotational speed-detecting means for detecting a rotational speed of the engine, and vehicle speed-detecting means for detecting a traveling speed of the vehicle, and when the traveling speed of the vehicle detected by the vehicle speed-detecting means is lower than a predetermined value, the limited slip control torque is controlled depending on at least one of the pressure within the intake passage detected by the pressure-detecting means, the rate of change calculated by the change rate-calculating means, and the rotational speed of the engine detected by the engine rotational speed-detecting means.

Preferably, the vehicle includes an engine having an intake passage, the driving-wheel torque control system including pressure-detecting means for detecting pressure within the intake passage, and change rate-calculating means for calculating a rate of change in the pressure within the intake passage, and the limited slip control torque is controlled based on a basic control amount dependent on the pressure within the intake passage detected by the pressure-detecting means and the rate of change calculated by the change rate-calculating means.

More preferably, the vehicle includes trailing wheels, the driving-wheel torque control system including wheel rotational speed ratio-detecting means for detecting a difference between a ratio between rotational speeds of the left and right driving wheels and a ratio between rotational speeds of the left and right trailing wheels, vehicle speed-detecting means for detecting a traveling speed of the vehicle, and engine rotational speed-detecting means for detecting a rotational speed of the engine, and the basic control amount is corrected depending on at least one of the difference between the ratio between the rotational speeds of the left and right driving wheels and the ratio between the rotational speeds of the left and right trailing wheels detected by the wheel rotational speed ratio-detecting means, the traveling speed of the vehicle detected by the vehicle speed-detecting means, and the rotational speed of the engine detected by the engine rotational speed-detecting means.

Preferably, the driving wheel torque control system includes vehicle speed-detecting means for detecting a traveling speed of the vehicle, and the limited slip differential torque is calculated depending on the traveling speed of the vehicle detected by the vehicle speed-detecting means such that the limited slip differential torque progressively increases as the traveling speed of the vehicle increases from a first predetermined value to a second predetermined value, and progressively decreases as the traveling speed of the vehicle increases above the second predetermined value.

More preferably, the vehicle includes an engine having an intake passage, the driving-wheel torque control system including pressure-detecting means for detecting pressure within the intake passage, and decrease rate-calculating means for calculating a rate of decrease in the pressure within the intake passage detected by the pressure-detecting means, and the limited slip differential torque is calculated depending on the rate of decrease calculated by the decrease rate-calculating means.

More preferably, a portion of the limited slip differential torque is corrected, depending on the pressure within the intake passage detected by the pressure-detecting means, such that the limited slip differential torque progressively increases as the pressure within the intake passage increases from a first predetermined value to a second predetermined value.

Preferably, the vehicle includes left and right trailing wheels, and the limited slip differential torque is calculated depending on a difference between a ratio between rotational speeds of the driving wheels and a ratio between rotational speeds of the trailing wheels.

The above and other objects, features and advantages of the invention will become more apparent from the following detailed description taken in conjunction with the accompanying drawings.

DETAILED DESCRIPTION OF THE PREFERRED EMBODIMENTS

The invention will now be described in detail with reference to drawings showing a preferred embodiment thereof.

Figure 1:
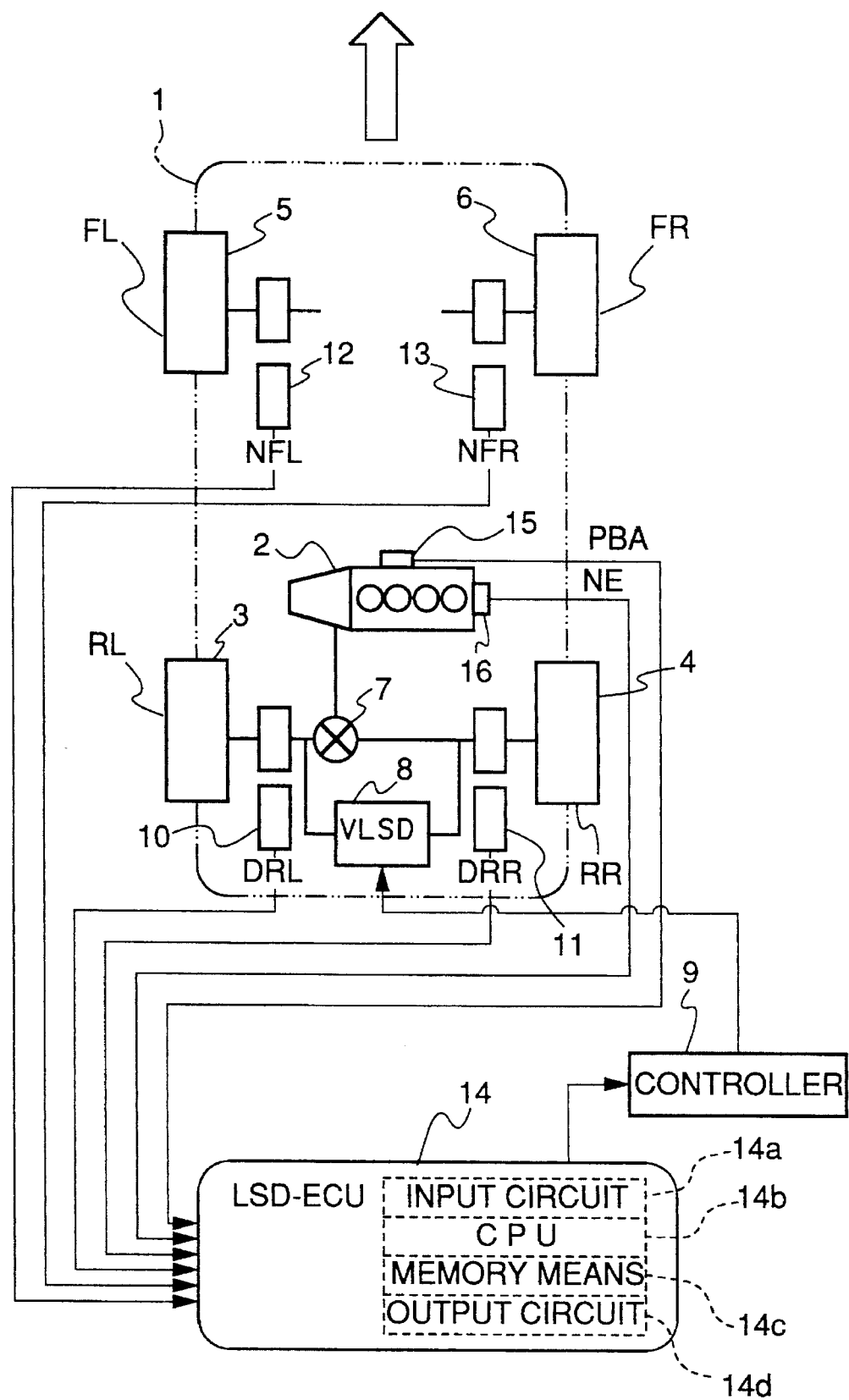
FIG. 1 is a block diagram showing the whole arrangement of a driving-wheel torque control system for an automotive vehicle according to a preferred embodiment of the invention.

FIG. 1 shows the whole arrangement of a driving-wheel torque control system for an automotive vehicle according to the preferred embodiment.

In the figure, reference numeral 1 designates a rear-engine rear wheel-driven vehicle (so-called RR car) having a straight-type four-cylinder internal combustion engine (hereinafter simply referred to as "the engine") 2 installed in a rear part of the vehicle. The vehicle includes a rear left wheel (RL) 3 and a rear right wheel (RR) 4 as driving wheels arranged at rear lateral sides thereof, and a front left wheel (FL) 5 and a front right wheel (FR) 6 as trailing wheels arranged at front lateral sides thereof.

The rear left wheel (RL) 3 and the rear right wheel (RR) 4 are connected via a differential 7 to the engine 2. The differential 7 operates during cornering of the vehicle to create a proper difference in the rotational speed between the rear left (RL) wheel 3 and the rear right wheel (RR) 4 while evenly distributing the drive torque of the engine to the two driving wheels 3, 4.

Arranged between a drive torque input and a drive torque output of the differential 7 is a variable limited slip differential torque-creating device 8 which is formed of a multiple friction disc clutch, etc. The variable limited slip differential torque-creating device 8 operates to create a variable amount of limited slip differential torque (LSD torque) such that it is proportional to a clutch-engaging force applied by a hydraulic pressure generator, not shown, which is driven by a controller 9, to thereby transmit the LSD torque to a driving wheel on a low μ road portion side which is racing and a driving wheel on a high μ road portion side which is not racing, such that reduced torque is transmitted to the racing wheel and increased torque is transmitted to the non-racing wheel, when the vehicle is traveling on a split μ road or the like to thereby properly control the difference in the rotational speed between the rear left and right driving wheels 3, 4.

A rear left wheel rotational speed (DRL) sensor 10 and a rear right wheel rotational speed (DRR) sensor 11 are arranged in the vicinity of the rear left wheel (RL) 3 and the rear right wheel (RR) 4, respectively, while a front left wheel rotational speed (NFL) sensor 12 and a front right wheel rotational speed (NFR) sensor 13 are arranged in the vicinity of the front left wheel (FL) 5 and the front right wheel (FR) 6 respectively. The DRL sensor 10, the DRR sensor 11, the NFL sensor 12, and the NFR sensor 13 detect the rotational speeds of the rear left wheel (RL) 3, the rear right wheel (RR) 4, the front left wheel (FL) 5, and the front right wheel (FR) 6, respectively, and supply electric signals indicative of the respective detected rotational speeds to an electronic control unit (hereinafter referred to as "the LSD-ECU") for controlling the LSD torque 14.

Further, an intake pipe absolute pressure (PBA) sensor 15 is provided in an intake pipe, not shown, in the vicinity of an intake port, not shown, of the engine 2. The PBA sensor 15 is electrically connected to the LSD-ECU 14 and supplies an electric signal indicative of the sensed intake pipe absolute pressure PBA thereto.

An engine rotational speed (NE) sensor 16 is provided in facing relation to a camshaft or crankshaft, neither of which is shown, of the engine 2. The NE sensor 16 generates signal pulses (hereinafter referred to as "TDC signal pulses") whenever the crankshaft rotates through 180° which are supplied to the LSD-ECU 14.

The LSD-ECU 14 comprises an input circuit 14a having the functions of shaping the waveforms of input signals from various sensor as mentioned above, shifting the voltage levels of sensor output signals to a predetermined level, converting analog signals from analog-output sensors to digital signals, and so forth, a central processing unit (hereinafter referred to as "the CPU") 14b, memory means 14c formed of a ROM storing various operational programs which are executed by the CPU 14b, and various maps and tables, referred to hereinafter, and a RAM for storing results of calculations therefrom, etc. and an output circuit 14d from which a signal of the LSD torque is delivered to the controller 9, which in turn supplies a command signal to the variable limited slip differential torque-creating device 8. Further, the LSD-ECU 14 calculates the engine rotational speed NE by measuring intervals of generation of the TDC signal pulses.

Figure 2:
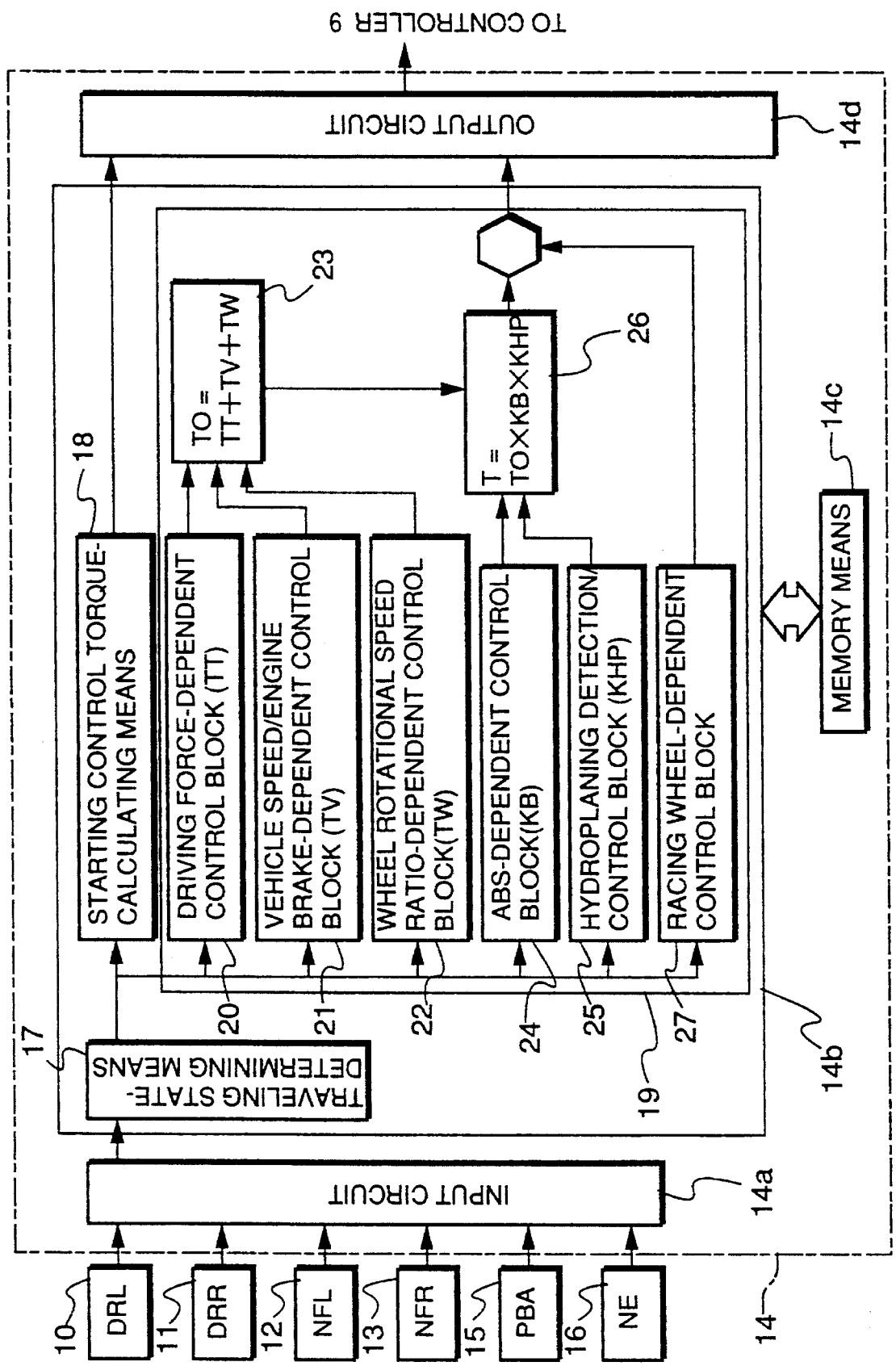
FIG. 2 is a block diagram which is useful in explaining details of control executed by an LSD-ECU appearing FIG. 1.

Next, details of control executed by the LSD-ECU 14 will be described with reference to FIG. 2.

Output signals from the DRL sensor 10, the DRR sensor 11, the NFL sensor 12, the NFR sensor 13, the PBA sensor 15, and the NE sensor 16 are supplied via the input circuit 14a to the CPU 14b, where the LSD torque T is calculated and supplied via the output circuit 14d to the controller 9.

The CPU 14b includes traveling state-determining means 17, starting control torque-calculating means 18, and traveling control torque-calculating means 19.

More specifically, the traveling state-determining means 17 determines whether a vehicle speed VN, detected as described later, is lower than a predetermined lower limit value VLMT (e.g. 3 to 4 Km/hr). If VN<VLMT, it is determined that the vehicle is being started, and the starting control torque-calculating means 18 calculates a starting control torque TS and delivers a signal indicative of the calculated TS value via the output circuit 14d to the controller 9. The vehicle speed VN is determined based on a higher one of the rotational speeds of the front left and right wheels 5, 6 as non-driving wheels, as will be described hereinbelow. During start-up of the vehicle, the vehicle speed VN is so small that it is impossible for the LSD-ECU 14 to recognize or read output signals from the NFL sensor 12 and the NFR sensor 13. Therefore, the starting control torque TS, i.e., LSD torque T suitable for start-up of the vehicle, is calculated based on the intake pipe absolute pressure PBA and the engine rotational speed NE.

On the other hand, if the vehicle speed VN is equal to or higher than the predetermined lower limit value VLMT, the LSD-ECU 14 reads data of rotational speeds of the wheels supplied from the wheel rotational speed sensors (DRL sensor 10, DRR sensor 11, NFL sensor 12, NFR sensor 13), and the traveling control torque-calculating means 19 calculates the LSD torque T and delivers a signal indicative of the calculated T value via the output circuit 14d to the controller 9.

The traveling torque control means 19 comprises a driving force-dependent control block 20 which calculates a driving force-dependent control torque TT, i.e., control torque dependent on the driving force of the engine, based on the intake pipe absolute pressure PBA, the wheel rotational speeds, etc, a vehicle speed/engine brake-dependent control block 21 which calculates a vehicle speed/engine brake-dependent control torque TV based on the vehicle speed VN and the magnitude of force of the engine brake, and a wheel rotational speed ratio-dependent control block 22 which calculates a wheel rotational speed ratio-dependent control torque TW based on a ratio between the rotational speeds of the left and right driving wheels (rear wheels) 3, 4 and a ratio between the rotational speeds of the left and right trailing wheels (front wheels) 5, 6. The control means 19 also includes adding means 23 which calculates a basic LDS torque TO by adding together these control torques by the use of Equation (1):

$$TO = TT + TV + TW \qquad (1)$$

The traveling control torque-calculating means 19 further comprises an ABS-dependent control block 24 which calculates an ABS-dependent correction coefficient to inhibit the LSD torque T from acting on the driving wheels when an anti-lock brake system (hereinafter referred to as "the ABS system"), not shown, which is installed in the vehicle, operates, and a hydroplaning detection/control block 25 which calculates a hydroplaning-dependent correction coefficient KHP for coping with a hydroplaning phenomenon occurring when the vehicle is traveling at a high speed. The control means 19 also includes LSD torque-calculating means 26 which calculates the LSD torque T by multiplying the basic LSD torque TO by the ABS-dependent correction coefficient KB and the hydroplaning-dependent correction coefficient KHP, by the use of Equation (2):

$$T=TO \times KB \times KHP \quad (2)$$

Further, the traveling torque control-calculating means 19 has a racing wheel-dependent control block 27 which operates to control the LSD torque such that the LSD torque T is created at a constant level when both the driving wheels of the vehicle traveling on a split μ road or the like start to race, to thereby prevent degradation of the drivability of the vehicle.

Next, the starting control torque-calculating means 18 and the traveling control torque-calculating means 19 will be described in detail.

[1] Starting Control Torque-Calculating Means

Figure 3:
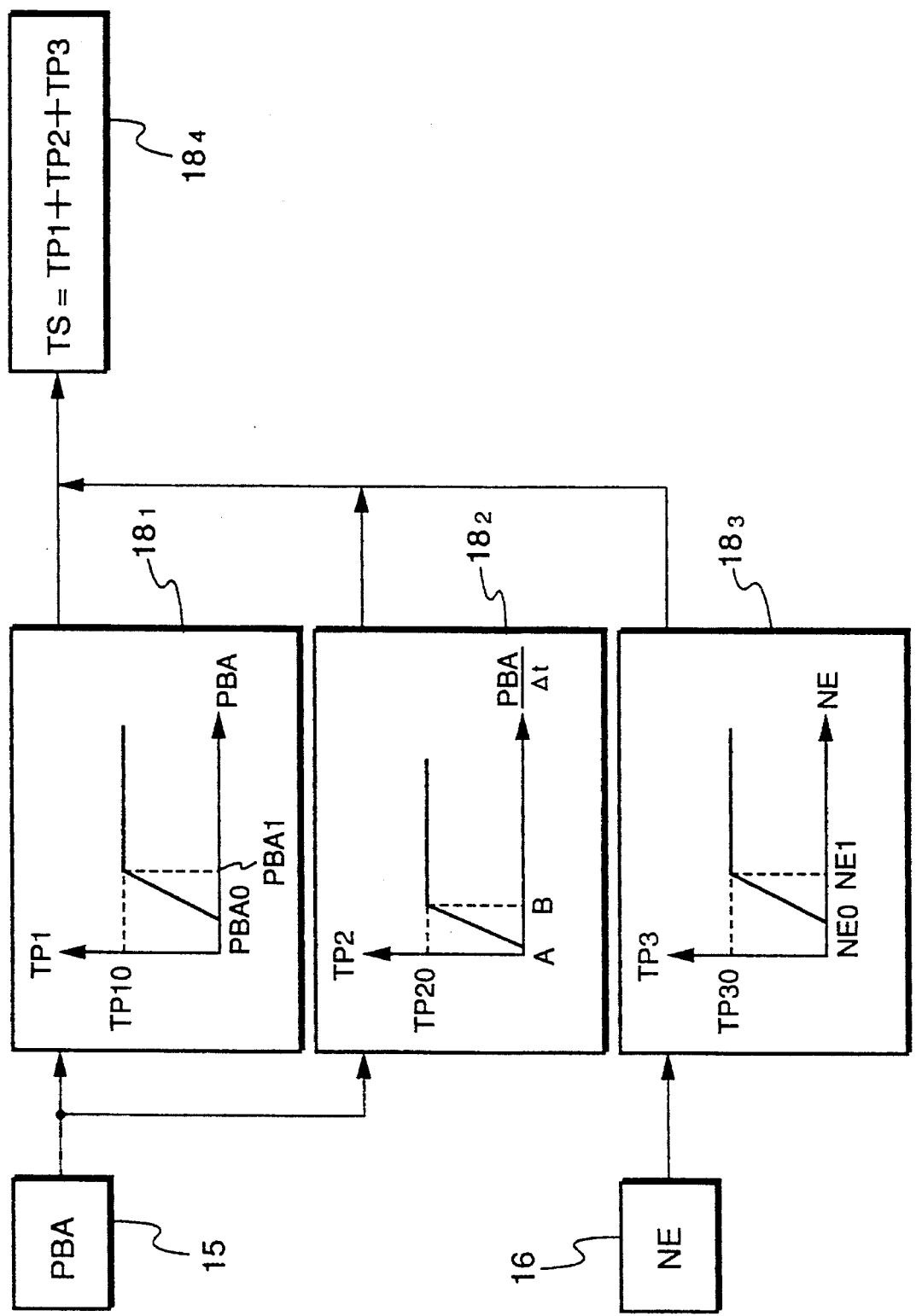
FIG. 3 is a block diagram which is useful in explaining control executed by starting control torque-calculating means appearing in FIG. 2.

As described hereinabove, during start-up of the vehicle, the vehicle speed VN is so small that the LSD-ECU 14 cannot read data of rotational speeds of the four wheels 3, 4, 5, 6. Therefore, as shown in FIG. 3, the LSD torque T (=TS) suitable for start-up of the vehicle is determined based on the intake pipe absolute pressure PBA and the engine rotational speed NE.

More specifically, after reading data of the intake pipe absolute pressure PBA from the PBA sensor 15, the LSD-ECU 14 retrieves a TP1 map $18_1$ and a TP2 map $18_2$ stored in the ROM of the memory means 14c to determine control torque (first starting control torque TP1 and second starting control torque TP2) depending on the intake pipe absolute pressure PBA and a rate of change (PBA/Δt) thereof.

According to the TP1 map $18_1$, when the intake pipe absolute pressure PBA is equal to or lower than a first predetermine value PBA0 (e.g. 100 mmHg), i.e., a very low value assumed when a throttle valve, not shown, of the engine is substantially fully closed, the first starting control torque TP1 is set to 0 since the LSD torque is not then required, and with an increase in the intake pipe absolute pressure PBA, the first starting control torque TP1 is increased. When the intake pipe absolute pressure PBA exceeds a second predetermined value PBA1 (e.g. 300 mmHg), the torque TP1 is set to and held at a predetermined value TP10 (e.g. 5 kg×m). That is, when the LSD torque is increased to a value larger than required, a driving wheel or wheels are liable to race. To avoid this inconvenience, the torque TP1 is held at the predetermined value TP10 when the intake pipe absolute pressure PBA exceeds the second predetermined value PBA1. The first starting control torque TAP1 is determined by reading predetermined map values from the TP1 map $18_1$, and additionally by interpolation, if required.

According to the TP2 map $18_2$, when a rate of change (PBA/Δt) in the intake pipe absolute pressure PBA is equal to or lower than a predetermine very small value A, the second starting control torque TP2 is set to 0, and with an increase in the rate of change (PBA/Δt) of the intake pipe absolute pressure PBA, the second starting control torque TP2 is increased. When the rate of change (PBA/Δt) exceeds a predetermined value B, the torque TP2 is set to and held at a predetermined value TP20 (e.g. 5 kg×m). The second starting control torque TAP1 is determined by reading predetermined map values from the TP1 map $18_1$, and additionally by interpolation, if required.

This makes it possible to cope with a sudden change in the intake pipe absolute pressure PBA which occurs, when the accelerator pedal is suddenly stepped on at the standing start of the vehicle. In addition, the reason why the predetermined value TP2 is set to 0 when the rate of change (PBA/Δ)of the intake pipe absolute pressure PBA is equal to or lower than the predetermined value A is that when the rate of change is very small, it is not required to apply the LSD torque.

A third starting control torque TP3 is determined by retrieving a TP3 map $18_3$ stored in the memory means 14c according to the engine rotational speed NE detected by the NE sensor 16.

According to the TP3 map, when the engine rotational speed NE is equal to or lower than a first predetermined value NE0 (e.g. 1000 rpm) in the vicinity of idling engine speed, the third starting control torque TP3 is set to 0. As the engine rotational speed NE increases beyond the first predetermined value NE0, the third starting control torque TP3 is increased. When the engine rotational speed NE exceeds a second predetermined value NE1 (e.g. 3000 rpm), the control torque TP3 is set to and held at a predetermined value TP30 (e.g. 5 kg×m). The third starting control torque TP3 is determined by reading predetermined map values from the TP3 map 183, and additionally by interpolation, if required.

Then, starting control torque-determining means $18_4$ adds together the first to third starting control torques TP1 to TP3 by the use of Equation (3) to obtain the final starting control torque TS, followed by terminating the calculation of the LSD torque T (=TS):

$$TS=TP1+TP2+TP3 \quad (3)$$

This makes it possible to deliver a signal indicative of the LSD torque T to the controller 9, which is suitable for start-up of the vehicle, dependent on the intake pipe absolute pressure PBA and the engine rotational speed NE, even when the rotational speeds of the wheels are too small to be detected by the sensors, to thereby suppress racing of a driving wheel or wheels at the start of the vehicle, attaining enhanced drivability of the vehicle. Further, as is clear from the TP1 map to TP3 map 181 to $18_3$, the values of TP1 to TP3 are set to values not higher than the respective predetermined values TP10 to TP30, which prevents the starting torque TS from becoming larger than a predetermined value (e.g. 15 kg ×m). Therefore, even if the accelerator pedal is stepped on in order to increase the engine rotational speed NE when the vehicle is in a garage, the vehicle can be easily turned around, and vibration of the variable limited slip differential torque-creating device 8 can be prevented.

Figure 4:
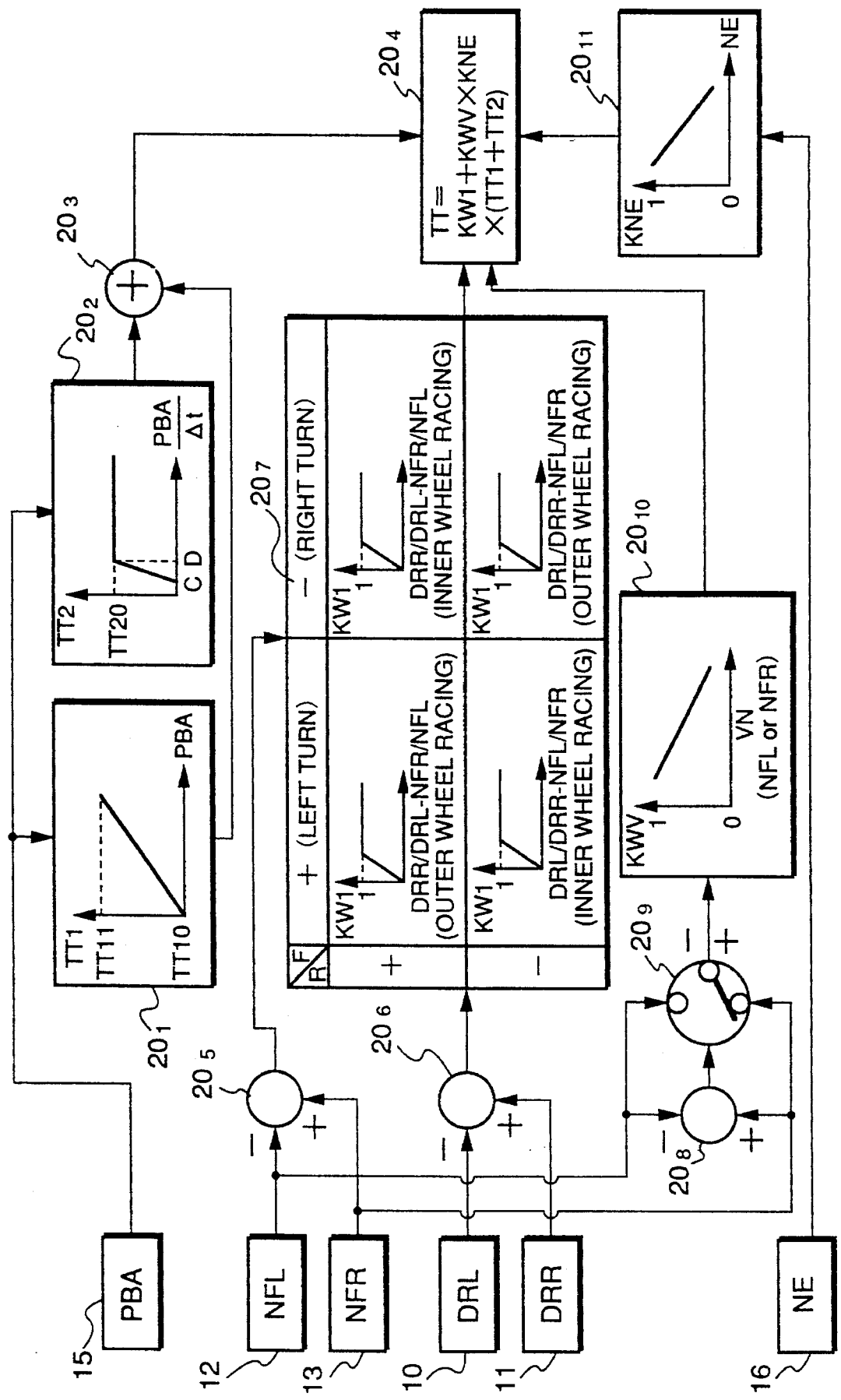
FIG. 4 is a block diagram which is useful in explaining control executed by a driving force-dependent control block appearing in FIG. 2.

[2] Traveling Control Torque-Calculating Means (1) Driving Force-Dependent Control Torque FIG. 4 shows a block diagram showing details of the driving force-dependent control block 20, according to which a basic driving force-dependent control torque calculated based on the intake pipe absolute pressure PBA is multiplied by a wheel rotational speed-dependent correction coefficient KW1, a vehicle speed-dependent correction coefficient KWV, and an engine rotational speed-dependent correction coefficient KNE to thereby calculate the driving force-dependent control torque TT.

More specifically, after the intake pipe absolute pressure PBA detected by the PBA sensor 15 is read, the basic driving force control torque (a first basic driving force-dependent control torque TT1 and a second basic driving force-dependent control torque TT2) dependent on the intake pipe absolute pressure PBA and the rate of change (PBA/Δt) thereof is determined by retrieving a TT1 map $20_1$ and a TT2 map $20_2$ stored in the memory means 14c.

According to the TT1 map $20_1$, the first basic driving force-dependent control torque TT1 is set to a larger value from TT10 (e.g. 0 kg×m) to TT11 (e.g. 100 kg×m), as the intake pipe absolute pressure PBA increases, for instance. The first basic driving force-dependent control torque TT1 is determined by reading predetermined map values from the TT1 map $20_1$ and additionally by interpolation, if required.

The TT2 map $20_2$ is provided to cope with a sudden change in the intake pipe absolute pressure PBA which occurs when the accelerator pedal is suddenly stepped on. Similarly to the above TP2 map $18_2$ (in FIG. 3), when the rate of change (PBA/Δt) of take intake pipe absolute pressure PBA is equal to or smaller than a predetermined value C, the second basic driving force-dependent control torque TT2 is set to 0, and when it exceeds a predetermined value D, the control torque TT2 is set to and held at a predetermined value TT20 (e.g. 5 kg×m). The second basic driving force-dependent control torque TT2 is determined by reading predetermined map values from the TT2 map $20_2$, and additionally by interpolation, if required.

Thus, the first and second basic driving force-dependent control torques TT1 and TT2 are calculated based on the intake pipe absolute pressure PBA and the rate of change (PBA/Δt) thereof which has a more rapid response than changes in the rotational speeds of the wheels, to thereby make it possible to reduce a time lag in transmitting the LSD torque to the driving wheels.

Further, the intake pipe absolute pressure PBA is determined by the opening of the throttle valve linked to the accelerator pedal, and hence it is possible for the driver to control the LSD torque as he intends, to some extent.

The values of the first and second basic driving force control torques TT1, TT" thus determined are added together by adder means $20_3$, and the resulting sum is input to driving force control-dependent torque-calculating means $20_4$.

On the other hand, the rotational speeds of the front left and right wheels 5 and 6 as the trailing wheels detected by the NFL sensor 12 and the NFR sensor 13 and input to the LSD-ECU 14 are compared with each other by comparator means $20_5$, to determine whether the vehicle is turning left or right.

Further, the rotational speeds of the rear left and right wheels 3 and 4 as the driving wheels detected by the DRL sensor 10 and the DRR sensor 11 and input to the LSD-ECU 14 are compared with each other by comparator means $20_6$, to determine whether the outer driving wheel is racing or the inner driving wheel is racing during cornering of the vehicle. Then, a wheel rotational speed ratio is determined, according to one of the following possible combinations of positive and negative values of output signals from both the comparator means $20_5$ and $20_6$:

(i) In the case of left turning and racing of the outer wheel, a wheel rotational speed ratio DRR/DRL-NFR/NFL;

(ii) In the case of left turning and racing of the inner wheel, a wheel rotational speed ratio DRL/DRR-NFL/NFR;

(iii) In the case of right turning and racing of the inner wheel, a wheel rotational speed ratio DRR/DRL-NFR/NFL; and (iv) In the case of right turning and racing of the inner wheel, a wheel rotational speed ratio DRL/DRR-NFL/NFR.

Then, a wheel rotational speed ratio-dependent correction coefficient KW1 is read from a KW1 map 207 stored in the memory means 14c according to the determined wheel rotational speed ratio. As shown in the KW1 map $20_7$ appearing in FIG. 4, the wheel rotational speed ratio-dependent correction coefficient KW1 increases with an increase in the wheel rotational speed ratio so long as the wheel rotational speed ratio is small, and the coefficient KW1 is set to "1" when the ratio reaches a predetermined value.

Thus, the timing of applying the LSD torque T is determined depending on the state of racing of a driving wheel, and the wheel rotational speed ratio-dependent correction coefficient KW1 thus determined is delivered to the driving force torque-determining means $20_4$.

Further, the rotational speeds of the front left and right wheels 5 and 6 detected by the NFL sensor 12 and the NFR sensor 13 are input to comparator means $20_8$. By selecting means $20_9$ connected to the comparator means $20_8$, the higher one of the rotational speeds of the front left and right wheels 5 and 6 is selected as the vehicle speed VN. That is, when one of the front wheels is traveling on a low μ road surface, if the brakes are applied, the front wheel traveling on the low μ road surface slips, so that the rotational speed of this wheel exhibits a larger drop than that of the other front wheel which does not slip. In such a case, the vehicle speed VN based on an average value of the rotational speeds of the front wheels shows a value largely different from the actual vehicle speed VN. Therefore, the vehicle speed VN is determined based on the larger one of the rotational speeds of the front wheels 5 and 6, to prevent a detected value of the vehicle speed VN from exhibiting a false drop.

When the vehicle speed VN is determined by the selecting means $20_9$, the vehicle speed-dependent correction coefficient KWV is determined by retrieving a KWV map $20_{10}$ according to the vehicle speed VN.

According to the KWV map $20_{10}$, the coefficient KWV is set to a smaller value as the vehicle speed VN increases. That is, when the vehicle speed is traveling at a high speed, i.e., when the speed VN is high, the behavior of the vehicle is liable to be unstable. As a result, if the control torque is applied when the vehicle is traveling at such a high speed, in the same manner as it is traveling at a low speed, the vehicle exhibits too sensitive a behavior to the control torque applied. Therefore, with an increase in the vehicle speed VN, the vehicle speed-dependent correction coefficient VN is set to a smaller value, to thereby make stable the behavior of the vehicle traveling at a high speed. The vehicle speed-dependent correction coefficient thus determined is input to the driving force-dependent control torque-determining means $20_4$.

The engine rotational speed-dependent correction coefficient KNE is determined by retrieving a KNE map stored in the memory means 14c according to the engine rotational speed NE detected by the NE sensor 16.

The KNE map $20_{11}$ is set similarly to the KWV map $20_{10}$ such that a map value of the coefficient KNE decreases with an increase in the engine rotational speed NE. That is, when the rotational speed NE is high, the output torque of the engine can change violently, and hence the behavior of the engine becomes unstable. Therefore, as the engine rotational speed NE increases, the engine rotational speed-dependent correction coefficient KNE is set to a smaller value, to thereby make stable the behavior of the vehicle traveling at a high speed. The engine rotational speed-dependent correction coefficient KNE thus determined is input to the driving force control-dependent torque-determining means $20_4$.

Then, the driving force-dependent control torque-determining means $20_4$ calculates the driving force-dependent control torque TT by the use of Equation (4):

$$TT=KW1 \times KWV \times KNE \times (TT1+TT2) \qquad (4)$$

Thus, the basic driving force-dependent control torque is determined based on the intake pipe absolute pressure PBA and the rate of change thereof, and the timing of application of the LSD torque is determined based on the wheel rotational speed ratio during cornering of the vehicle. Further, the basic driving force-dependent control torque is corrected depending on the vehicle speed VN and the engine rotational speed NE, to thereby obtain the driving force control torque TT suitable for the behavior of the vehicle.

(2) Vehicle Speed/Engine Brake-Dependent Control Block

Figure 5:
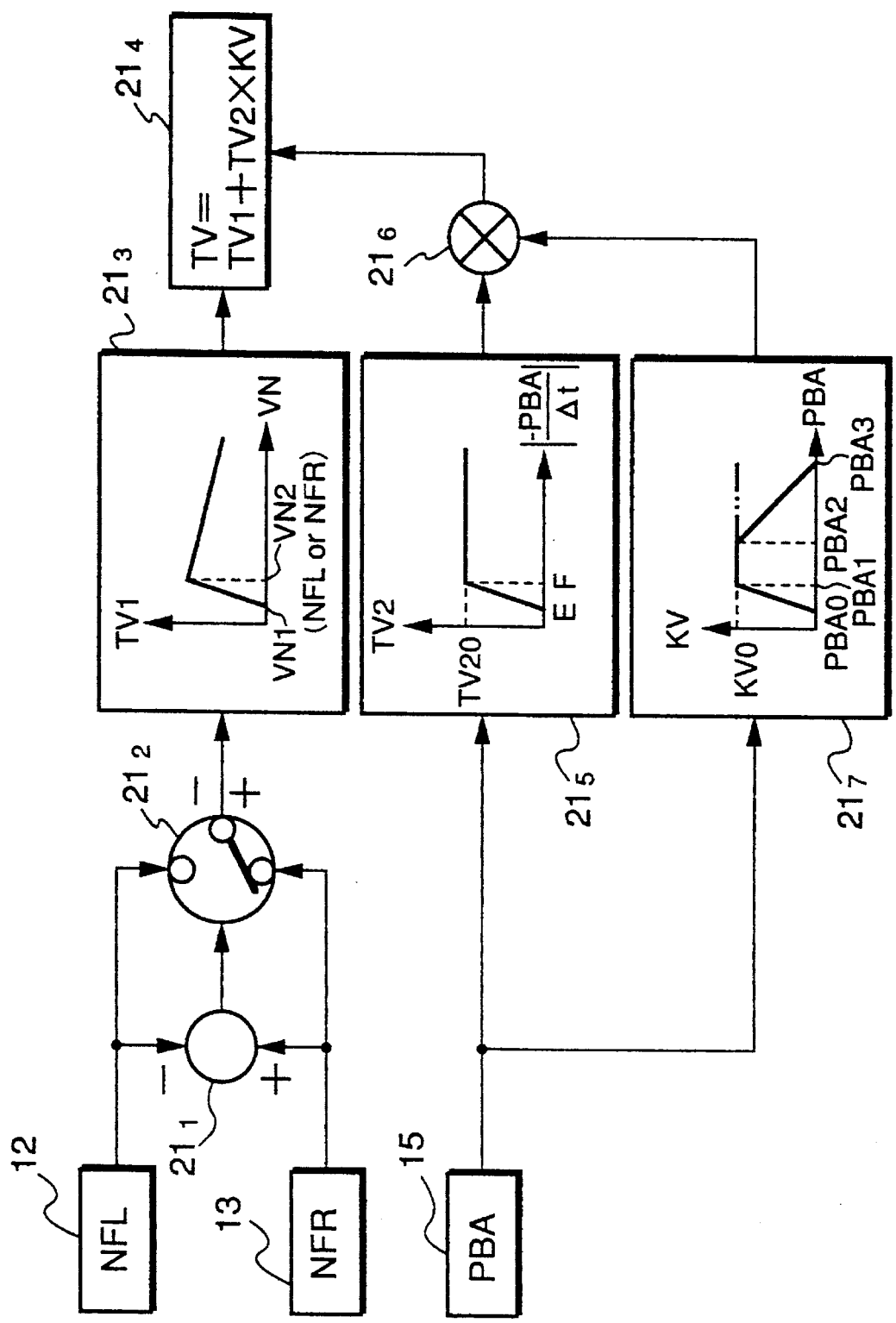
FIG. 5 is a block diagram which is useful in explaining control executed by a vehicle speed/engine brake-dependent control block appearing in FIG. 2.

FIG. 5 is a block diagram showing details of the vehicle speed/engine brake-dependent control.

First, a vehicle speed-dependent control torque TV1 is calculated based on the rotational speeds of the front left and right wheels 5 and 6.

More specifically, similarly to the driving force-dependent control block 20 described above, the rotational speeds of the left and right front wheels 5 and 6 detected by the NFL sensor 12 and the NFR sensor 13 are input to comparator means $21_1$, and selecting means $21_2$ connected to the comparator means $21_1$ selects the larger one of the rotational speeds as the vehicle speed VN.

Then, the vehicle speed-dependent control torque TV1 is determined by retrieving a TV1 map $21_3$ stored in the memory means according to the vehicle speed VN.

According to the TV1 map $21_3$, as the vehicle speed VN increases above a predetermined value VN1 (e.g. 50 km/hr), the vehicle speed-dependent control torque is increased, and as the vehicle speed VN increases above a second predetermine value VN2, the vehicle speed-dependent control torque is progressively decreased. That is, the stability of the vehicle at a high traveling speed obtained by the LSD torque T becomes lower as the vehicle speed VN increases, and hence if the control torque is always controlled to a small value suitable for a high vehicle speed, it is disadvantageous when the vehicle is put into a garage or the like. Further, as already described above, when the vehicle is traveling at a high speed, the stability obtained by the LSD torque becomes lower as the vehicle speed becomes higher, and hence there is a loss of energy, if a fixed amount of control torque is always applied. Therefore, when the vehicle is traveling at a high speed, the vehicle speed-dependent control torque TV1 is applied in such a moderate amount just sufficient for securing the stability of the vehicle traveling at a high speed to suppress the loss of energy, whereby it is possible to secure the stability of the vehicle when it is traveling at a high speed.

The vehicle speed-dependent control torque 21 thus determined is input to vehicle speed/engine brake-dependent control torque-calculating means $21_4$.

Further, the engine brake-dependent control is carried out based on the intake pipe absolute pressure PBA detected by the PBA sensor 15. That is, when the engine brake is applied, the deceleration of the vehicle increases to largely change the driving force of the engine, resulting in instability of the vehicle. Therefore, when the engine brake is applied, the control torque is applied in an adequate amount to thereby prevent the behavior of the vehicle from becoming unstable. More specifically, a basic engine brake-dependent control torque TV2 is determined by retrieving a TV2 map $21_5$ stored in the memory means 14c according to a rate of decrease (−PBA/Δt) of the intake pipe absolute pressure PBA.

According to the TV2 map $21_5$, as the rate of decrease (−PBA/Δt) increases above a first predetermined value E, the basic engine brake-dependent control torque TV2 is increased, and when the rate of change exceeds a second predetermined value F, the control torque TV2 is set to and held at a predetermined value TV20. That is, from the rate of decrease in the absolute pressure PBA, the magnitude of the force of the engine brake can be estimated. The engine brake-dependent control torque TV2 is determined by reading predetermined map values from the TV2 map $21_5$, and additionally by interpolation, if required. The determined TV2 value is delivered to multiplying means $21_6$.

Further, an engine brake-dependent correction coefficient KV is determined by retrieving a KV map stored in the memory means 14c according to the intake pipe absolute pressure PBA. The KV map is set such that predetermined map values are provided in a manner corresponding to predetermined values of the intake pipe absolute pressure PBA. More specifically, as the intake pipe absolute pressure PBA increases above a first predetermined value PBA0, the correction coefficient KV is increased, and as the intake pipe absolute pressure PBA increases above a second predetermined value PBA1, the correction coefficient KV is set to and held at a predetermined value KV0. As the intake absolute pressure PBA increases above a third predetermined value PBA2, the correction coefficient KV is decreased, and when the intake pipe absolute pressure PBA exceeds a fourth predetermined value PBA3, the correction coefficient KV is set to "0". The reason for decreasing the correction coefficient KV to smaller values as the intake pipe absolute pressure PBA increases above the third predetermined value PBA2 is that when the intake pipe absolute pressure PBA is large, i.e. when the throttle valve is substantially fully opened, the engine brake-dependent control need not be carried out. In addition, as indicated by the two-dot chain line in FIG. 5, the correction coefficient KV may be set such that when the intake pipe absolute pressure PBA exceeds the second predetermined value PBA1, it assumes the predetermined value KV0 so long as the intake pipe absolute pressure PBA is higher than the second predetermined value PBA1.

The engine brake-dependent correction coefficient KV thus determined is input to the multiplying means $21_6$ where it is multiplied by the basic engine brake-dependent control torque TV2.

In this way, the control torque is calculated to a value suitable for a change in the driving force occurring during cornering of the vehicle at a decelerated speed.

Then, the thus determined value of this control torque is input to the vehicle speed/engine brake-dependent control torque-calculating means $21_4$, where the vehicle speed/engine brake-dependent control torque TV is calculated by the use of Equation (5):

$$TV = TV1 + TV2 \times KV \qquad (5)$$

Thus, the LSD torque is calculated so as to achieve both the stability of the vehicle to be secured when the vehicle is running straight at a high speed, and the stability of same to be secured when it is cornering at a decelerated speed.

(3) Wheel Rotational Speed Ratio-Dependent Control Block

Figure 6:
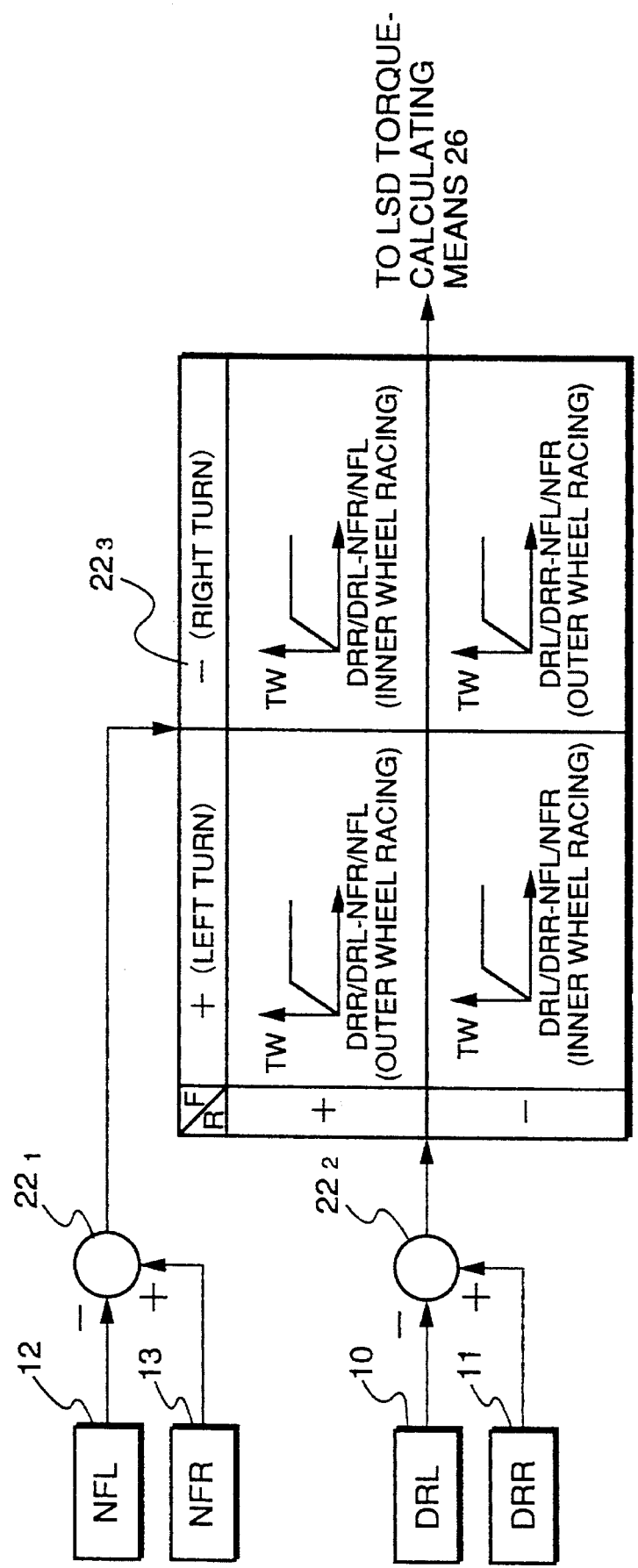
FIG. 6 is a block diagram which is useful in explaining control executed by a wheel speed ratio-dependent control block appearing in FIG. 2.

FIG. 6 is a block diagram showing details of the wheel rotational speed ratio-dependent control block 22, according to which a wheel rotational speed ratio-dependent control torque TW is calculated in a similar manner to the manner in which wheel rotational speed ratio-dependent correction coefficient KW1 is calculated in the driving force-dependent control block 20 described above. More specifically, the rotational speeds of the front left and right wheels 5 and 6 detected by the NFL sensor 12 and the NFR sensor 13 are compared by comparator means $22_1$, to determine whether the vehicle is turning left or right.

On the other hand, the rotational speeds of the rear left and right wheels 3 and 4 detected by the DRL sensor 10 and the DRR sensor 11 are compared by comparator means $22_2$, to determine whether the outer wheel of the driving wheels is racing or the inner wheel of same is racing during cornering of the vehicle. Then, similarly to the case where the wheel rotational speed ratio-dependent correction coefficient KW1 is calculated, it is determined from a combination of positive value(s) and/or negative value(s) of output signals from the comparator means $22_1$ and $22_2$ which of the aforementioned four types of behavior the vehicle is exhibiting, and accordingly the wheel rotational speed ratio corresponding to the determined behavior is calculated. Then, the wheel rotational speed-dependent control torque TW is determined by retrieving a TW map $22_3$ stored in the memory means 14c according to the calculated wheel rotational speed ratio. In this connection, the wheel rotational speed ratio-dependent control torque TW is set, similarly to the wheel rotational speed-dependent correction coefficient KW1 (in FIG. 4), such that so long as the ratio is smaller than a predetermined value, the control torque TW is set to larger values as the ratio increases, and when the ratio exceeds the predetermined value, the control torque is set to and held at a predetermined value.

(4) ABS-Dependent Control

An ABS-ECU, not shown, performs the ABS control for preventing wheels from being locked to cause slippage thereof, when the braking operation is carried out. In general, such ABS control is performed on individual wheels on a road surface, independently of each other. Therefore, if the LSD torque is applied during the ABS control, there is a fear that the ABS control is interfered. To avoid this, in the present embodiment, to inhibit application of the LSD torque T during the ABS control, the ABS-dependent control is performed.

Figure 7:
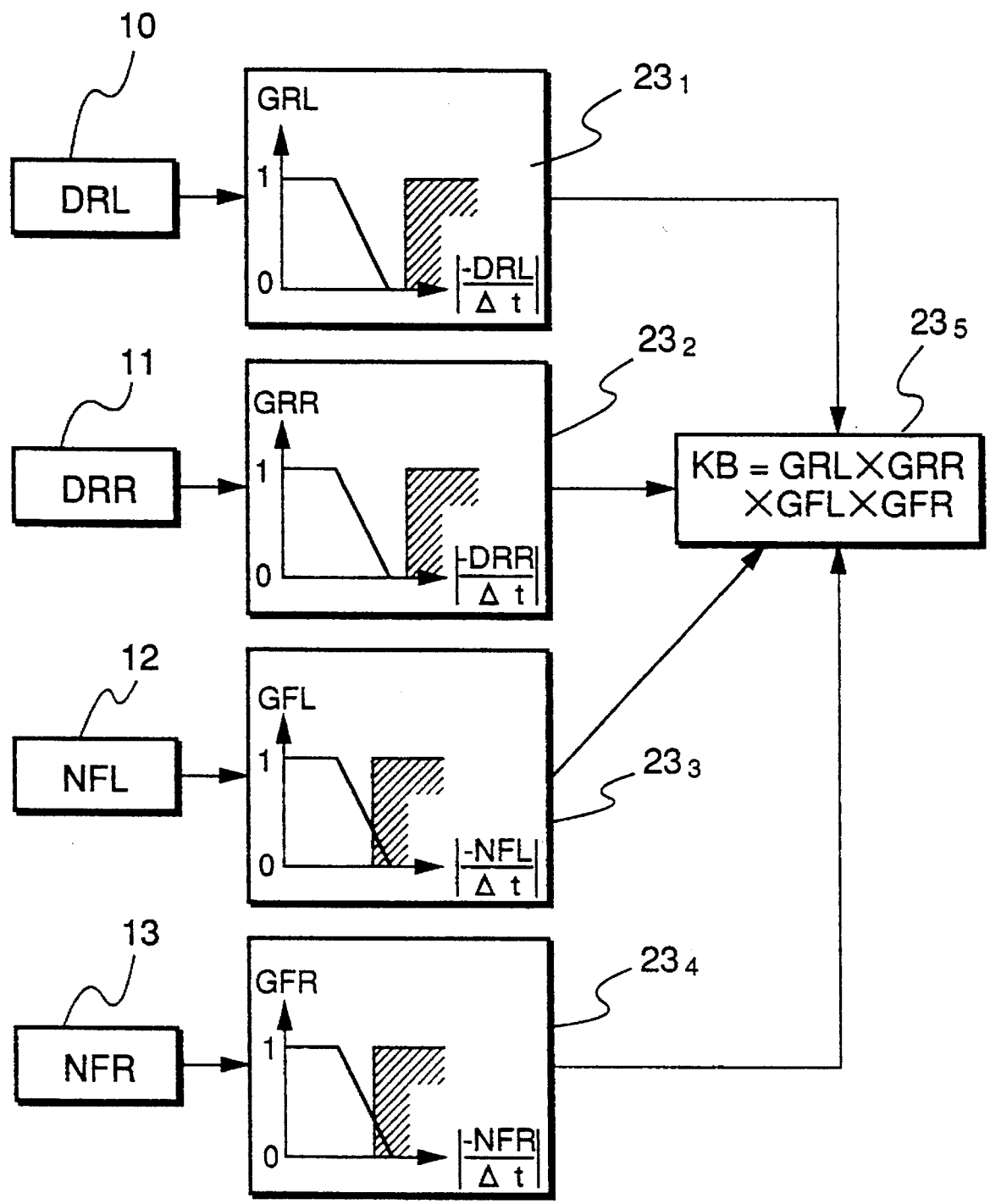
FIG. 7 is a block diagram which is useful in explaining control executed by an ABS-dependent control block appearing in FIG. 2.

More specifically, according to the rotational speeds of the rear left and right wheels 3, 4 detected by the DRL sensor 10 and the DRR sensor 11 as well as the rotational speeds of the front left and right wheels 5, 6 detected by the NFL sensor 12 and the NFR sensor 13, ABS-dependent correction values GRL, GRR, GFL, GFR corresponding to decelerations of the rotational speeds of these wheels are determined by retrieving a GRL map $23_1$, a GRR map $23_2$, a GFL map $23_3$, and a GFR map $23_4$ shown in FIG. 7. In the maps $23_1$ to $23_4$, the hatched portions indicate regions where the ABS control is performed. According to the present embodiment, for the rear left and right wheels 3, 4, the application of the LSD torque T is stopped immediately before the ABS control starts to be carried out, whereas for the front left and right wheels 5, 6, the application of the LSD torque T is stopped immediately after the ABS control starts to be carried out.

ABS-dependent correction coefficient-calculating means $23_5$ calculates an ABS-dependent correction coefficient KB by multiplying together the ABS-dependent correction values GRL, GRR, GFL, GFR thus calculated by the use of Equation (4):

$$KB = GRL \times GRR \times GFL \times GFR \qquad (4)$$

This makes it possible to maintain the LSD torque when the vehicle is normally traveling, and to cancel the LSD torque immediately before or after the ABS control is started on one of the four wheels, to thereby ensure the controllability of the vehicle by the ABS control. Further, although the ABS control is performed differently on each of the four wheels depending on the behavior thereof, it is possible to cope with such differences in the manner of ABS control among the individual wheels, by storing the above maps in the memory means 14c and varying map values thereof.

Further, in the present embodiment, the LSD torque T is controlled by the use of the above maps prepared according to the decelerations of rotational speeds of the wheels, independently of the ABS control. Therefore, it is not required to receive a signal indicative of operation of the brake switch or the ABS control to interrupt the application of the LSD torque T, which dispenses with the use of communication lines between the ABS-ECU and the LSD-ECU 14, leading to a simplified construction of the system.

(5) Hydroplaning/Detection Control

Figure 8:
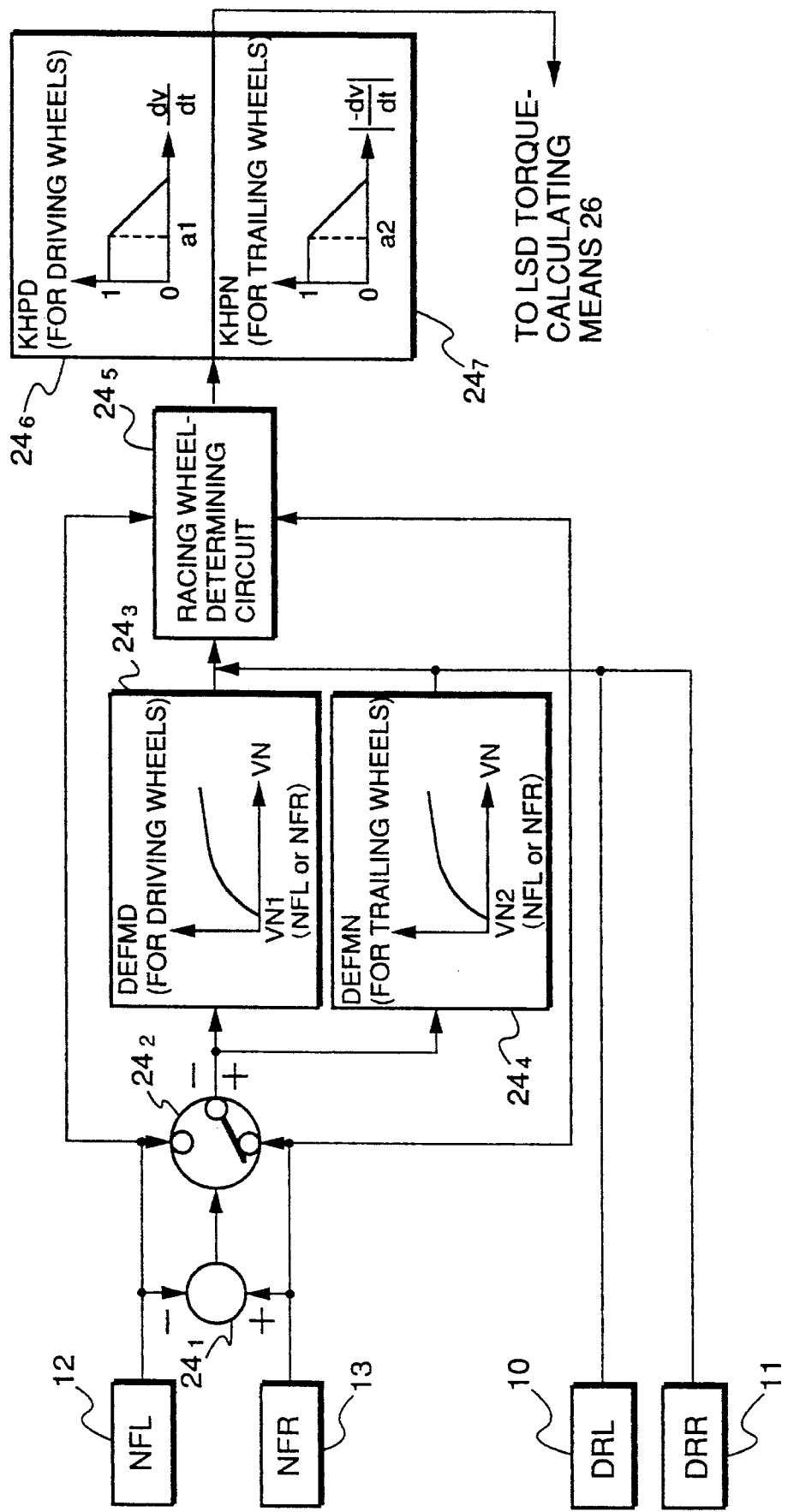
FIG. 8 is a block diagram which is useful in explaining control executed by a hydroplaning detection/control block appearing in FIG. 2.

FIG. 8 is a block diagram showing details of the hydroplaning detection/control, according to which when the vehicle speed exceeds a predetermined value, the wheels are checked for racing, and if the acceleration or deceleration of a racing wheel is above a predetermined value, it is determined that hydroplaning has occurred, whereupon the control torque is reduced by a hydroplaning-dependent correction coefficient.

More specifically, output signals from the NFL sensor 12 and the NFR sensor 13 are input to comparator means $24_1$, and selecting means $24_2$ connected thereto determines the vehicle speed VN from the input signals. Then, when the vehicle speed VN is higher than a predetermined value, a desired differential rotational speed DEFMD for the driving wheels and a desired differential rotational speed DEFMN for the trailing wheels are determined by retrieving a DEFMD map $24_3$ and a DEFMN map $24_4$ stored in the memory means 14c according to the vehicle speed VN. That is, if hydroplaning is detected based on the vehicle speed VN alone, the LSD torque control may be undesirably responsive to slight changes in the vehicle speed VN. Therefore, in the present embodiment the hydroplaning is detected also based on the differential rotational speeds between the left and right driving wheels or the left and right trailing wheels. The DEFMD map $24_3$ and the DEFMN map $24_4$ are set such that map values thereof are provided along a parabolic line relative to the vehicle speed VN. That is, from the point the vehicle speed VN exceeds a predetermined value VN1 or VN2 (e.g. 50 to 60 km/hr) above which hydroplaning can occur, the desired differential rotational speeds of the driving wheels and the trailing wheels are allowed to rise rather gently, which enables the desired differential rotational speeds to follow a change in the vehicle speed VN smoothly.

A racing wheel-determining circuit $24_5$ is supplied with outputs from the NFL sensor 12, the NFR sensor 13, the DRL sensor 10 and the DRR sensor 11, as well as values of the desired differential rotational speeds DEFMD and DEFMN to determine whether racing of a wheel occurs. If racing of a wheel occurs, it is determined which wheel is racing. If a driving wheel is racing, the acceleration (dv/dt) of the racing wheel is detected, whereas if a trailing wheel is racing, the deceleration (−dv/dt) of the racing wheel is detected.

Then, if a driving wheel is racing, a hydroplaning-dependent coefficient KHPD for driving wheels is determined by retrieving a KHPD map $24_6$ according to the acceleration (dv/dt), whereas if a trailing wheel is racing, a hydroplaning-dependent coefficient KHPN for trailing wheels is determined by retrieving a KHPN map $24_7$ according to the deceleration (−dv/dt). The KHPD map $24_6$ and the KHPN map $24_7$ are set such that as the acceleration (dv/dt) and the deceleration (−dv/dt) increase above predetermined values a1 and a2, the hydroplaning-dependent coefficients KHPD and KHPN are decreased, respectively. That is, when the acceleration (dv/dt) or the deceleration (−dv/dt) exceeds the predetermined value a1 or a2, it is determined that hydroplaning has occurred, and then the hydroplaning-dependent coefficient KHPD or KHPN is decreased.

Then, the thus determined hydroplaning-dependent correction coefficient KHP (KHPD or KHPN) is delivered to the LSD torque-calculating means 26. Thus, when the acceleration or deceleration of a racing wheel exceeds the predetermined value a1 or a2, the hydroplaning-dependent correction coefficient KHPD or KHPN is decreased, to thereby reduce the LSD torque T.

Figure 9:
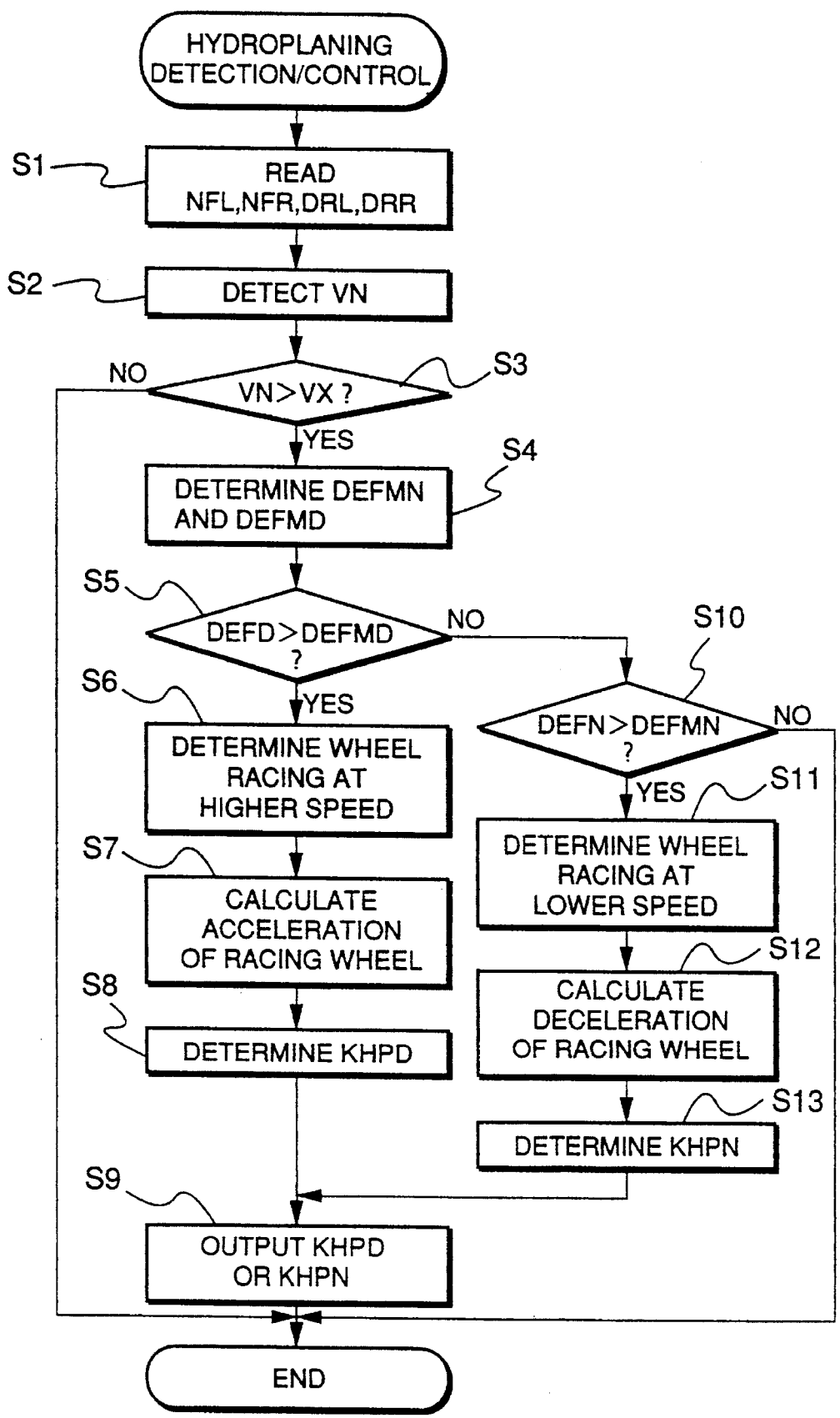
FIG. 9 is a flowchart of a hydroplaning detection/control routine.

FIG. 9 shows a routine for detecting hydroplaning and performing hydroplaning-dependent LSD torque control executed by the LSD-ECU 14.

First, at a step S1, outputs from the NFL sensor 12, NFR sensor 13, DRL sensor 10, and DRR sensor 11 are read, and at a step S2, the outputs from the NFL sensor 12 and the NFR sensor 13 are compared with each other, to determine the larger one of them as the vehicle speed VN.

Then, at a step S3, it is determined whether or not the vehicle speed VN is larger than a predetermined value VX. The predetermined value VX is set to a value, e.g. 50 to 60 km/hr above which hydroplaning can occur, as described hereinabove. If the answer to this question is negative (NO), it is judged that hydroplaning will not occur, followed by terminating the program.

On the other hand, if the answer to the question of the step S3 is affirmative (YES), it is judged that hydroplaning can take place, and then the program proceeds to a step S4 et seq. where it is determined whether or not hydroplaning has occurred based on a difference in the rotational speed between the left and right driving wheels and between the left and right trailing wheels, and calculate the hydroplaning-dependent correction coefficient KHP suitable for the behavior of the vehicle to control the LSD torque.

More specifically, at the step S4, desired differential rotational speeds DEFMD and DEFMN between the driving wheels and between the trailing wheels, respectively, are determined according to the vehicle speed VN. Then, it is determined at a step S5 whether or not the actual differential rotational speed DEFD between the driving wheels is larger than the desired differential rotational speed DEFMD. If the answer to this question is affirmative (YES), it is judged that a driving wheel is racing, and then it is determined at a step S6 that the driving wheel having the larger rotational speed is racing.

Then, at a step S7, the acceleration (dv/dt) of the racing driving wheel determined at the step S6 is calculated, and then at a step S8, the KHPD map is retrieved according to the acceleration (dv/dt), to determine a driving-wheel hydroplaning-dependent correction coefficient KHPD. The determined KHPD value is supplied to the LSD torque-determining means 26, followed by terminating the program.

On the other hand, if the answer to the question of the step S5 is negative (NO), the program proceeds to a step S10, where it is determined whether or not the actual differential rotational speed DEFN between the trailing wheels is larger than the desired differential rotational speed DEFMN. If the answer to this question is negative (NO), the program is immediately terminated, whereas if the answer is affirmative (YES), it is judged that a trailing wheel is racing, and then it is determined at a step S11 that the trailing wheel having the lower rotational speed is racing.

Then, at a step S12, the deceleration (−dv/dt) of the racing wheel determined at the step S11 is calculated, and then at a step S13, the KHPN map is retrieved according to the deceleration (−dv/dt), to determine a trailing wheel hydroplaning-dependent correction coefficient KHPN. The determined KHPN value is supplied to the LSD torque-calculating means 26, followed by terminating the program.

Thus, the LSD torque can be promptly reduced based on the acceleration of the driving wheel or the deceleration of the trailing wheel when hydroplaning has occurred, to thereby secure improved drivability and stability of behavior of the vehicle travelling at a high speed.

In addition, although, in the present embodiment, the hydroplaning detection/control is performed based on the differential rotational speeds between the left and right wheels, this is not limitative, but this control may be properly carried out insofar as it is based on a factor related to the rotational speeds of the wheels. Further, the control may be carried out based on the ratio between the rotational speeds of the left and right wheels.

(5) Racing Wheel-Dependent Control

Figure 10:
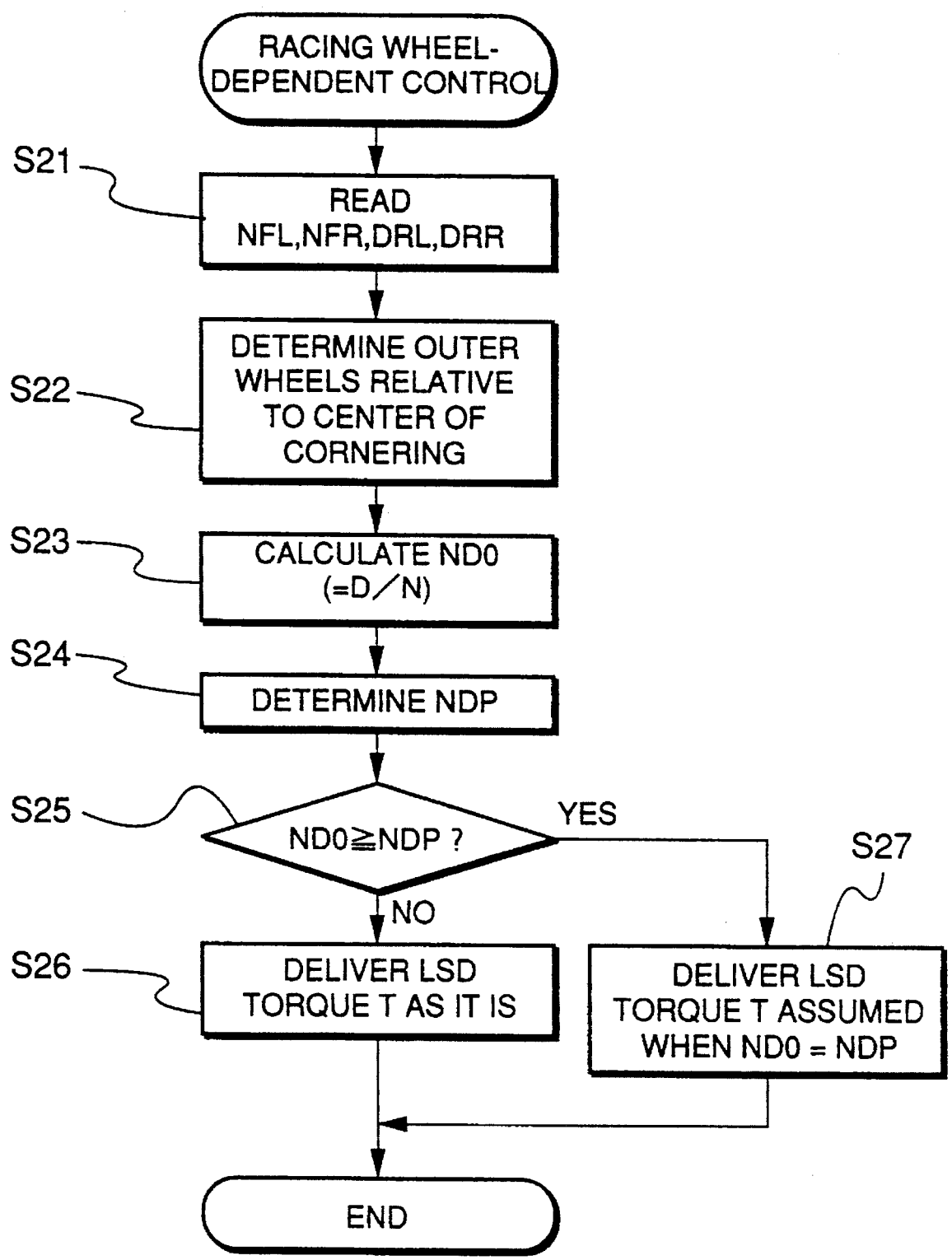
FIG. 10 is a block diagram which is useful in explaining control executed by a racing wheels-dependent control block appearing in FIG. 2.

FIG. 10 shows a routine for performing the LSD torque control when both of the driving or trailing wheels are racing during cornering of the vehicle.

First at a step S21, the rotational speeds of the four wheels detected by the NFL sensor 12, the NFR sensor 13, the DRL sensor 10, and the DRR sensor 11, are read. Then, at a step S22, it is determined based on these parameters which (left wheels or right wheels) of two pairs of rear and front wheels are inner wheels. The determination of the inner or outer wheels is carried out as previously described with reference to FIG. 4 concerning the calculation of the wheel rotational speed ratio-dependent correction coefficient KW1. Then, at a step S23, a calculation is made of a ratio in the rotational speed between the rear outer wheel and the front outer wheel, i.e. the detected outer wheel rotational speed ratio ND0 (=D/N). Then, a basic outer rotational speed ratio NDP (the ratio of the rotational speed of the outer driving wheel to that of the outer trailing wheel) above which the outer wheels can race is determined by retrieving a NDP map at a step S24.

Figure 11:
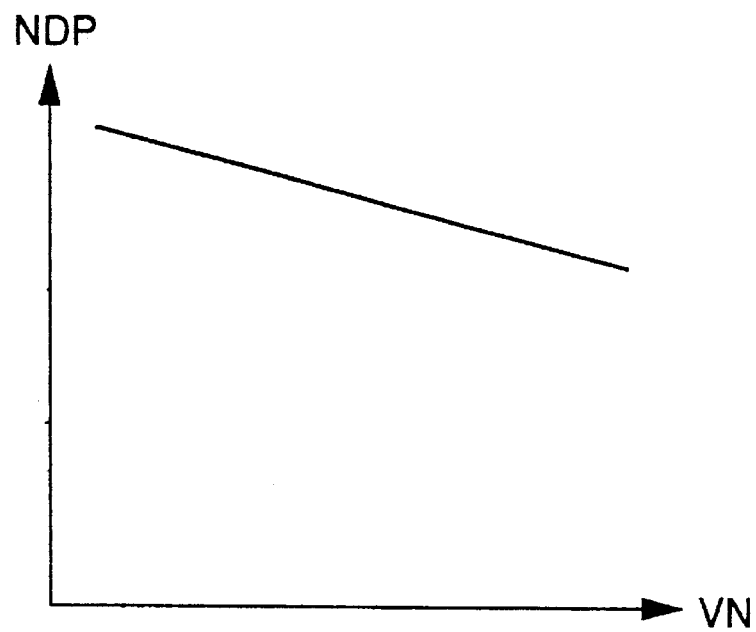
FIG. 11 shows an NDP map.

The NDP map is set, e.g. as shown in FIG. 11, such that a map value of NDP decreases as the vehicle speed VN determined based on outputs from the NFL sensor 12 and the NFR sensor 13 increases. The basic outer rotational speed ratio NDP is determined by reading predetermined map values from the NDP map, and additionally by interpolation, if required.

Then, at a step S25, it is determined whether or not the detected outer wheel rotational speed ratio ND0 is larger than the basic outer wheel rotational speed ratio NDP. If the answer to this question is negative (NO), a value of the LSD torque T calculated by the LSD torque-calculating means 26 is output as it is, whereas if the answer is affirmative (YES), it is judged that both the driving wheels are racing, and hence the LSD torque T is held at a value assumed when the outer wheel rotational speed ratio is equal to the basic outer wheel rotational speed ratio NDP, followed by delivering it to the LSD torque-calculating means 26 at a step S27.

Thus, even if both the driving wheels race during cornering of the vehicle, the LSD torque T is neither reduced nor canceled, to transmit a desired amount of the LSD torque to the driving wheels, which prevents the drivability of the vehicle from being degraded as well as offensive vibrations from being generated from the variable limited slip differential torque-creating device 8.

Further, according to the above described control, even if both the driving wheels are intentionally caused to slip when the vehicle is travelling on a split μ road, the LSD torque is neither decreased nor cancelled, which prevents the drivability of the vehicle from being degraded as well as offensive vibrations from being generated from the torque-transmitting system of the vehicle.

Further, although, in the present embodiment, the racing of both the driving wheels is determined based on the outer wheel rotational speed ratio ND0 assumed during cornering of the vehicle, this is not limitative, but wheel rotational speed ratios between the left driving and trailing wheels and between the right driving and trailing wheels may be calculated, and when one of these wheel rotational speed ratios exceeds a predetermined value, it may be determined that one wheel is racing, to hold the LSD torque T to a value assumed when the wheel rotational speed ratio is equal to the predetermined value for allowing same to be transmitted to the driving wheels. In this alternative case, even if one wheel races on a split μ road or the like, no large variation should occur in the LSD torque, which makes it possible to prevent the variable limited differential torque-creating device from generating offensive variations.

Further, it may be determined that both the driving wheels are racing when the wheel rotational speed ratios between the driving (rear) wheels and the trailing (front) wheels both exceed respective predetermined values. In this alternative case, even if both the driving wheels race when the vehicle is running straight on a snow-covered road, an icy road or the like, the LSD torque is not reduced or cancelled, which prevents the drivability of the vehicle from being degraded.

Further, although, in the above described embodiment, if ND0≧NDP, the LSD torque assumed when ND0=NDP is allowed to be transmitted, this is not limitative, but it is also preferable that when the above condition is satisfied, the LSD torque having a value (T+ΔT) which is larger than the LSD torque T assumed when ND0=NDP by a predetermined amount ΔT may be allowed to be transmitted.

Figure 12:
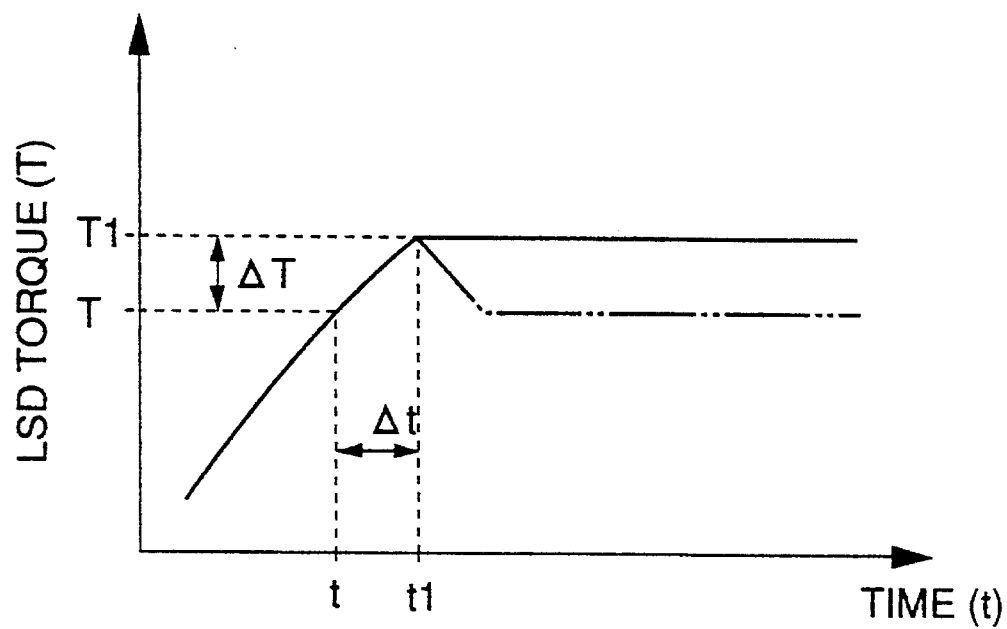
FIG. 12 is a diagram showing changes in the LSD torque T occurring with lapse of time.

More specifically, as shown in FIG. 12, assuming that the LSD torque applied at a time point t racing of the driving wheel is detected is equal to T, the actual LSD torque T1 (=T+ΔT) is delivered after a time lag Δt from the time point of detection of racing, so that the LSD torque T1 larger than the value T is transmitted to the driving wheels. In other words, if the LSD torque T assumed when the racing of the driving wheel is detected is applied, there is a drop in the LSD torque as indicated by the two-dot chain line in the figure, to cause instability of behavior of the vehicle. To eliminate this inconvenience, the LSD torque T1 which is larger than the value T by ΔT is applied to prevent a drop in the LSD torque to secure stability of the vehicle.

Further, the driving-wheel torque control system according to the invention may be constructed such that after holding the LSD torque T at a predetermined value over a predetermined time period, if it is found that this held value of the LSD torque cannot meet the driver's demand for the drivability and behavior of the vehicle, the LSD torque is reduced or canceled. In this alternative case, the LSD-ECU 14 may incorporate a timer for counting the predetermined time period, or the driver may reduce or cancel the LSD torque as he desires by manually operating a switch therefor.

Figure 13:
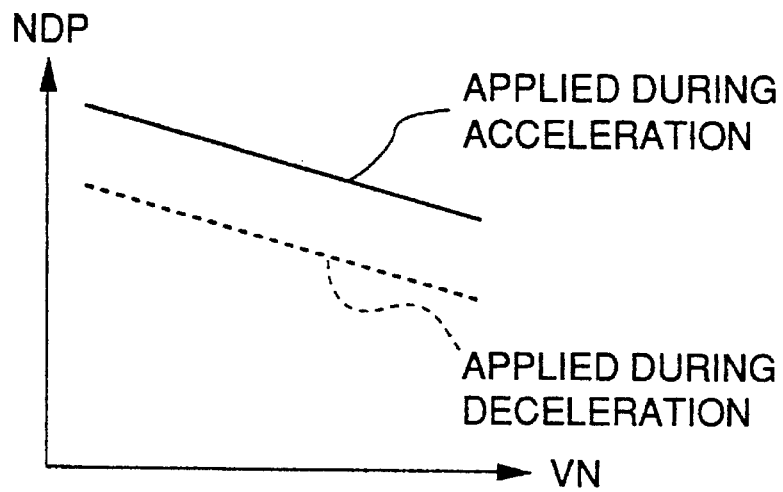
FIG. 13 shows another NDP map.

Further, the NDP map may be set, as shown in FIG. 13, in a simplified manner for explanation of a case of acceleration of the vehicle and a case of deceleration of same, such that different map values are applied depending on acceleration (including deceleration). The solid line in FIG. 13 indicates map values applied at a certain degree of acceleration of the vehicle, while the broken line indicates those applied at a certain degree of deceleration of the vehicle. As is clear from the figure, a map value of the basic outer rotational speed ratio NDP applied at acceleration having a lower value (including the state of deceleration) is lower than one applied at acceleration having a higher value at the same vehicle speed. Therefore, with respect to the detected outer wheel rotational speed ratio ND0, it is more readily determined that the driving wheels are racing when the vehicle is decelerating than when the vehicle is accelerating. The acceleration or deceleration of the vehicle is determined based on the rate ΔPBA of the intake pipe absolute pressure PBA or a rate ΔVN (VN/Δt) of change in the vehicle speed VN. This makes it possible to hold the LSD torque at a suitable value responsive to the state of acceleration or deceleration of the vehicle.

Alternatively, predetermined coefficients may be provided in a manner corresponding to a plurality of ranges of acceleration of the vehicle (including a plurality of ranges of deceleration of same), respectively, for multiplying the map value of the outer wheel rotational speed ratio NDP determined by the use of the LDP map shown in FIG. 11 by one of the coefficients selected depending on the detected acceleration or deceleration of the vehicle. This makes it possible to perform more delicate control of the driving-wheel torque control responsive to various changes in the travelling state of the vehicle.

Further, the predetermined amount ΔT added to a value T of the LSD torque having being applied when the condition of ND0=NDP was satisfied may be changed depending on the vehicle speed or the acceleration (including deceleration ) of the vehicle. This makes it possible to apply the LSD torque suitable for various states of racing of the driving wheels to thereby secure stability of behavior of the vehicle.

Figure 14:
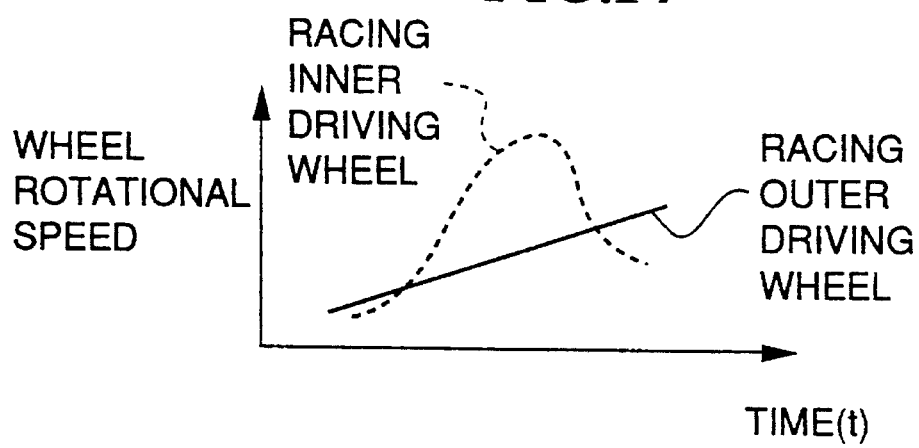
FIG. 14 is a diagram showing an example of changes in the state of racing of driving wheels.
Figure 15:
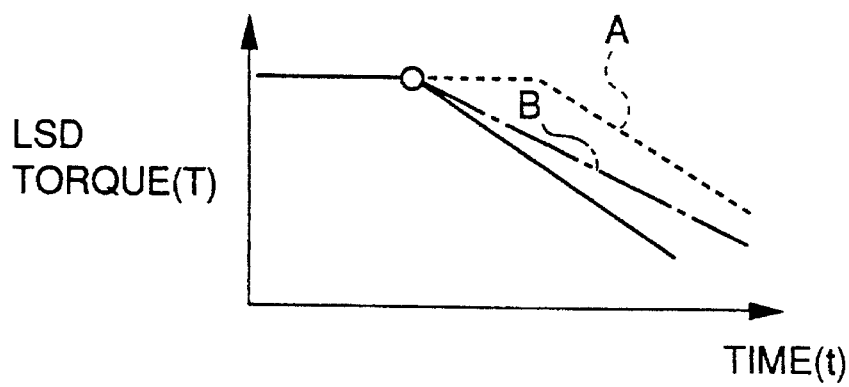
FIG. 15 is a diagram showing manners of holding and reducing of LSD torque.

Further, when the rotational speed of the inner one of the driving wheels, indicated by the broken line in FIG. 14, is detected to have drastically dropped (i.e. when the deceleration of the rotational speed of the inner driving wheel exceeds a predetermined value), the LSD torque T may be held over a longer time period as indicated by A in FIG. 15, or alternatively, the rate of reduction of the LSD torque after the lapse of the predetermined time period may be set to a smaller value as indicated by B in FIG. 15. This makes it possible to secure the stability of the vehicle when the rotational speed of the inner driving wheel has suddenly dropped (i.e. when the state of racing of the inner driving wheel has been drastically mitigated).

What is claimed is:

1. A driving-wheel torque control system for an automotive vehicle having left and right driving wheels, including a variable limited slip differential torque-creating device arranged between said left and right driving wheels for generating a predetermined limited slip differential torque such that reduced torque is transmitted to a racing one of said left and right driving wheels and increased torque is transmitted to a non-racing one of said left and right driving wheels, said driving-wheel torque control system comprising:
    racing state-determining means for determining whether or not both said driving wheels are in a predetermined racing state; and
    torque-holding means for holding said limited slip differential torque at a first value substantially equal to or close to a second value thereof based on the assumption that both said driving wheels are in said predetermined racing state, if it is determined by said racing state-determining means that both said driving wheels are in said predetermined racing state.

2. A driving-wheel torque control system according to claim 1, wherein said first value at which said limited slip differential torque is held is larger than said second value assumed when both said driving wheels are in said predetermined racing state.

3. A driving-wheel torque control system according to claim 1 or 2, wherein said torque-holding means includes torque-reducing/canceling means for reducing or cancelling said limited slip differential torque, after said limited slip differential torque is held at said first value over a predetermined time period.

4. A driving-wheel torque control system according to claim 3, wherein-said predetermined time period is set to a longer time period when the rotational speed of one of said driving wheels positioned on an inner side relative to the center of cornering of said vehicle has drastically dropped.

5. A driving-wheel torque control system according to claim 3, wherein said limited slip differential torque is decreased at a lower rate after said predetermined time period has elapsed, when the rotational speed of one of said driving wheels positioned on an inner side relative to the center of cornering of said vehicle has drastically dropped.

6. A driving-wheel torque control system according to claim 1, wherein said vehicle includes left and right trailing wheels, and said racing state-determining means determines that both said driving wheels are in said predetermined racing state, when a ratio of a rotational speed of one of said driving wheels positioned on an outer side relative to a center of cornering of said vehicle to a rotational speed of said trailing wheel positioned on said outer side is larger than a predetermined value.

7. A driving-wheel torque control system according to claim 6, including vehicle speed-detecting means for detecting a travelling speed of said vehicle, and wherein said predetermined value is set depending on said travelling speed detected by said vehicle speed-detecting means increases.

8. A driving-wheel torque control system according to claim 7, wherein said predetermined value is set to a smaller value as said traveling speed detected by said vehicle speed-detecting means increases.

9. A driving-wheel torque control system according to claim 8, including vehicle acceleration-detecting means for detecting an acceleration including deceleration of said vehicle, and wherein said predetermined value is set depending on said acceleration including deceleration detected by said vehicle acceleration-detecting means.

10. A driving-wheel torque control system according to claim 9, wherein said predetermined value is set to a lower value as said acceleration of said vehicle assumes a lower value.

11. A driving-wheel torque control system according to claim 1, including vehicle speed-detecting means for detecting a travelling speed of said vehicle, and wherein said first value at which said limited slip differential torque is held by said torque-holding means is set to a value dependent on said travelling speed detected by said vehicle speed-detecting means.

12. A driving-wheel torque control system according to any of claims 7 to 11, wherein said vehicle includes left and right trailing wheels, and said vehicle speed-detecting means detects said traveling speed of said vehicle based on the larger one of rotational speeds of said trailing wheels.

13. A driving-wheel torque control system according to claim 1, including vehicle acceleration-detecting means for detecting an acceleration including deceleration of said vehicle, and wherein said first value at which said limited slip differential torque is held by said torque-holding means is set to a value dependent on said acceleration including deceleration detected by said vehicle acceleration-detecting means.

14. A driving-wheel torque control system according to claim 1, wherein said first value at which said limited slip differential torque is held is equal to said second value assumed when said driving wheels are in said predetermined racing state.

15. A driving-wheel torque control system according to claim 1, wherein said vehicle includes left and right trailing wheels, and wherein said limited slip differential torque is reduced when acceleration of a racing one of said left and right driving wheels or deceleration of a racing one of said left and right trailing wheels exceeds a predetermined value thereof.

16. A driving-wheel torque control system according to claim 15, wherein said limited slip differential torque is decreased as the acceleration or deceleration is greater than a predetermined value.

17. A driving-wheel torque control system according to claim 15 or 16, including vehicle speed-detecting means for detecting a traveling speed of said vehicle, driving wheel rotational speed difference-detecting means for detecting a difference between rotational speed of said driving wheels, acceleration-calculating means for calculating acceleration of one of said driving wheels having a higher rotational speed, and torque-reducing means for reducing said limited slip differential torque according to said acceleration calculated by said acceleration-calculating means, when said traveling speed of said vehicle detected by said vehicle speed-detecting means is higher than a first predetermined value, said difference between the rotational speeds of said driving wheels detected by said rotational speed difference-detecting means is greater than a second predetermined value, and at the same time said acceleration calculated by said acceleration-calculating means is higher than a third predetermined value.

18. A driving-wheel torque control system according to claim 15 or 16, including vehicle speed-detecting means for detecting a traveling speed of said vehicle, trailing wheel rotational speed difference-detecting means for detecting a difference between rotational speeds of said trailing wheels, deceleration-calculating means for calculating deceleration of one of said trailing wheels having a lower rotational speed, and torque-reducing means for reducing said limited slip differential torque according to said deceleration calculated by said deceleration-calculating means, when said traveling speed of said vehicle detected by said vehicle speed-detecting means is higher than a first predetermined value, said trailing wheel rotational speed difference detected by said trailing wheel rotational speed difference-detecting means is higher than a second predetermined value, and at the same time said deceleration calculated by said deceleration-calculating means is higher than a third predetermined value.

19. A driving-wheel torque control system according to claim 1, wherein said vehicle includes an anti-lock brake system, and said driving-wheel torque control system includes torque-canceling means for canceling said limited slip differential torque immediately before or immediately after said anti-lock brake system starts to operate.

20. A driving-wheel torque control system according to claim 1, wherein said vehicle includes an engine having an intake passage, said driving-wheel torque control system including pressure-detecting means for detecting pressure within said intake passage, change rate-calculating means for calculating a rate of change in said pressure within said intake passage, and engine rotational speed-detecting means for detecting a rotational speed of said engine, and vehicle speed-detecting means for detecting a traveling speed of said vehicle, and wherein when said traveling speed of said vehicle detected by said vehicle speed-detecting means is lower than a predetermined value, said limited slip control torque is controlled depending on at least one of said pressure within said intake passage detected by said pressure-detecting means, said rate of change calculated by said change rate-calculating means, and said rotational speed of said engine detected by said engine rotational speed-detecting means.

21. A driving-wheel torque control system according to claim 1, wherein said vehicle includes an engine having an intake passage, said driving-wheel torque control system including pressure-detecting means for detecting pressure within said intake passage, and change rate-calculating means for calculating a rate of change in said pressure within said intake passage, and wherein said limited slip control torque is controlled based on a basic control amount dependent on said pressure within said intake passage detected by said pressure-detecting means and said rate of change calculated by said change rate-calculating means.

22. A driving-wheel torque control system according to claim 21, wherein said vehicle includes trailing wheels, said driving-wheel torque control system including wheel rotational speed ratio-detecting means for detecting a difference between a ratio between rotational speeds of said left and right driving wheels and a ratio between rotational speeds of said left and right trailing wheels, vehicle speed-detecting means for detecting a traveling speed of said vehicle, and engine rotational speed-detecting means for detecting a rotational speed of said engine, and wherein said basic control amount is corrected depending on at least one of said difference between said ratio between said rotational speeds of said left and right driving wheels and said ratio between said rotational speeds of said left and right trailing wheels detected by said wheel rotational speed ratio-detecting means, said traveling speed of said vehicle detected by said vehicle speed-detecting means, and said rotational speed of said engine detected by said engine rotational speed-detecting means.

23. A driving wheel torque control system according to claim 1, including vehicle speed-detecting means for detecting a traveling speed of said vehicle, and wherein said limited slip differential torque is calculated depending on said traveling speed of said vehicle detected by said vehicle speed-detecting means such that said limited slip differential torque progressively increases as said traveling speed of said vehicle increases from a first predetermined value to a second predetermined value, and progressively decreases as said traveling speed of said vehicle increases above said second predetermined value.

24. A driving-wheel torque control system according to claim 23, wherein said vehicle includes an engine having an intake passage, said driving-wheel torque control system including pressure-detecting means for detecting pressure within said intake passage, and decrease rate-calculating means for calculating a rate of decrease in said pressure within said intake passage detected by said pressure-detecting means, and wherein said limited slip differential torque is calculated depending on said rate of decrease calculated by said decrease rate-calculating means.

25. A driving-wheel torque control system according to claim 24, wherein a portion of said limited slip differential torque is corrected, depending on said pressure within said intake passage detected by said pressure-detecting means, such that said limited slip differential torque progressively increases as said pressure within said intake passage increases from a first predetermined value to a second predetermined value.

26. A driving-wheel torque control system according to claim 1, wherein said vehicle includes left and right trailing wheels, and wherein said limited slip differential torque is calculated depending on a difference between a ratio between rotational speeds of said driving wheels and a ratio between rotational speeds of said trailing wheels.

* * * * *